United States Patent
Suliman et al.

(10) Patent No.: US 12,509,783 B1
(45) Date of Patent: Dec. 30, 2025

(54) CONDUCTIVE COBALT BASED METAL ORGANIC FRAMEWORK ON CARBON CLOTH FOR WATER SPLITTING AND METHOD OF PREPARATION THEREOF

(71) Applicant: King Fahd University of Petroleum and Minerals, Dhahran (SA)

(72) Inventors: Munzir Hamedelniel Mohamed Suliman, Dhahran (SA); Muhammad Usman, Dhahran (SA); Syed Niaz Ali Shah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/213,312

(22) Filed: May 20, 2025

(51) Int. Cl.
| | | |
|---|---|---|
| *C25B 11/073* | (2021.01) | |
| *C23C 16/30* | (2006.01) | |
| *C25B 1/04* | (2021.01) | |
| *C25B 11/053* | (2021.01) | |
| *C25B 11/056* | (2021.01) | |
| *C25B 11/065* | (2021.01) | |

(52) U.S. Cl.
CPC ............ *C25B 11/073* (2021.01); *C23C 16/30* (2013.01); *C25B 1/04* (2013.01); *C25B 11/053* (2021.01); *C25B 11/056* (2021.01); *C25B 11/065* (2021.01)

(58) Field of Classification Search
None
See application file for complete search history.

(56) References Cited

U.S. PATENT DOCUMENTS

2011/0294044 A1   12/2011   Artero et al.

FOREIGN PATENT DOCUMENTS

| CN | 110943217 B | 5/2022 |
|---|---|---|
| CN | 112058281 B | 2/2023 |
| CN | 116180143 A | 5/2023 |
| CN | 116410478 B | 4/2024 |
| WO | 2024/085318 A1 | 4/2024 |

OTHER PUBLICATIONS

Suh et al. "Hydrogen Storage in Metal Organic Frameworks" Chem. Rev. 2012, 112, 782-835 (Year: 2012).*
Adpakpang et al. "Conductive Co-triazole metal-organic framework exploited as an oxygen evolution electrocatalyst" Chem. Commun., 2022, 58, 7124-7127 and SI (Year: 2022).*

(Continued)

*Primary Examiner* — Luan V Van
*Assistant Examiner* — Alexander R. Parent
(74) *Attorney, Agent, or Firm* — Oblon, McClelland, Maier & Neustadt, L.L.P.

(57) ABSTRACT

An electrocatalyst that includes a carbon cloth (CC) substrate including carbon fibers having a mean diameter of 2.5 to 25 micrometer (μm), and a catalyst disposed on the CC substrate, the catalyst including a conductive metal-organic framework (MOF) including a metal and triazole structural units, and a metal sulfide including the metal disposed on the conductive MOF. The catalyst is present as structures having a mean size of 2.5 to 25 μm and a surface texture having projections having a mean size of 100 to 500 nanometer (nm). The electrocatalyst is used in a method of forming hydrogen via the HER and a method of forming oxygen via the OER.

5 Claims, 15 Drawing Sheets

(56) References Cited

OTHER PUBLICATIONS

Yang et al. "Metal-organic framework derived CoS2/FeS-MOF with abundant heterogeneous interface as bifunctional electrocatalyst for electrolysis of water." International Journal of Hydrogen Energy 47 (2022) 33728-33740 (Year: 2022).*

Yu et al. "Bimetallic sulfide particles incorporated in Fe/Co-based metal-organic framework ultrathin nanosheets toward boosted electrocatalysis of the oxygen evolution reaction" Inorg. Chem. Front., 2022, 9, 3130 (Year: 2022).*

Zhao et al. "Constructing abundant phase interfaces of the sulfides/metal-organic frameworks p-p heterojunction array for efficient overall water splitting and urea electrolysis" Journal of Colloid and Interface Science 634 (2023) 630-641 (Year: 2023).*

Zhou et al. "Deliberate Amorphization of Co-MOF for Constructing Crystalline-Amorphous Heterostructures Toward High-Performance Water Electrolysis" Small 2024, 20, 2404598 and SI (Year: 2024).*

Ray et al. "Triazole-rich 3D metal-organic framework incorporated solid electrolytes for superior proton conductivity and durability in fuel cells" Phys. Chem. Chem. Phys., 2024, 26, 20971 (Year: 2024).*

Wang et al. "Synergistic regulation of sulfides and carbon in Fe-doped CoS2@MOF-based nanocomposites for enhanced catalytic performance" Journal of Alloys and Compounds 1030 (2025) 180769 (Year: 2025).*

Liu et al. "Self-Sacrificial Template-Directed Vapor-Phase Growth of MOF Assemblies and Surface Vulcanization for Efficient Water Splitting" Adv. Mater. 2019, 31, 1806672 and SI (Year: 2019).*

Kelong Ao, et al., "MOF-Derived Sulfide-Based Electrocatalyst and Scaffold for Boosted Hydrogen Production", ACS Applied Materials & Interfaces, vol. 12, Issue 30, Jul. 6, 2020, pp. 33595-33602, Abstract only, 2 pages.

Kanyaporn Adpakpang, et al., "Conductive Co-triazole metal-organic framework exploited as an oxygen evolution electrocatalyst", Chmical Communications, vol. 58, May 27, 2022, pp. 7124-7127.

* cited by examiner

EDS Layered Image 4

Co kα1

O kα1

S kα1

EDS Layered Image 3

C kα1_2

N kα1_2

O kα1

CONDUCTIVE COBALT BASED METAL ORGANIC FRAMEWORK ON CARBON CLOTH FOR WATER SPLITTING AND METHOD OF PREPARATION THEREOF

BACKGROUND

Technical Field

The present disclosure is directed towards an electrocatalyst, that includes cobalt sulfide (CoS) disposed on a cobalt metal-organic framework (Co-MOF) grown on carbon cloth (CC) designated (CoS/Co-Tri@CC).

Description of Related Art

The "background" description provided herein presents the context of the disclosure generally. The work of the presently named inventors, to the extent it is described in this background section, as well as aspects of the description that may not otherwise qualify as prior art at the time of filing, are neither expressly nor impliedly admitted as prior art against the present invention.

The development of clean and renewable energy sources has advanced significantly as a result of growing concerns about the exhaustion of fossil fuels and the release of carbon dioxide. Hydrogen is a promising alternative to fossil fuels. Its combustion process yields only water, making it a remarkably clean and environmentally friendly energy source. An effective way to produce high-quality hydrogen is by using the electrocatalytic process of water splitting. This method primarily involves a reaction called the hydrogen evolution reaction (HER). Platinum and other precious metals have been historically considered highly effective catalysts for the HER [Wang, J., Zhang, H., & Wang, X. (2017). Recent Methods for the Synthesis of Noble-Metal-Free Hydrogen-Evolution Electrocatalysts: From Nanoscale to Sub-nanoscale. Small Methods, 1(6), 1700118]. However, their very high cost and limited availability have spurred extensive research into alternative electrocatalysts that can operate without relying on these noble metals. Transition metal phosphides (TMPs) have gained attention as promising catalysts for the HER due to their similar catalytic function to hydrogenase. Doping cations or anions has been extensively investigated as an effective strategy to turn their electronic structures and optimize the free energy of hydrogen adsorption (DGH*) in order to further enhance their HER performance [Li, J., Yan, M., Zhou, X., Huang, Z. Q., Xia, Z., Chang, C. R., & Qu, Y. (2016). Mechanistic insights on ternary $Ni_{2-x}Co_xP$ for hydrogen evolution and their hybrids with graphene as highly efficient and robust catalysts for overall water splitting. Advanced Functional Materials, 26(37), 6785-6796]. Wang reported a porous cobalt sulfide/phosphide as an electrocatalyst, which demonstrated an overpotential of 123 mV in HER [Wang, C., Sui, G., Guo, D., Li, J., Zhang, L., Li, S., & Guo, W. (2021). Structure-designed synthesis of hollow/porous cobalt sulfide/phosphide based materials for optimizing supercapacitor storage properties and hydrogen evolution reaction. Journal of Colloid and Interface Science, 599, 577-Qu, anchored phosphorus-doped cobalt sulfide on carbon cloth, resulting in a 110 mV overpotential in HER [Qu, G., Wu, T., Yu, Y., Wang, Z., Zhou, Y., Tang, Z., & Yue, Q. (2019). Rational design of phosphorus doped cobalt sulfides electrocatalysts for hydrogen evolution. Nano Research, 12, 2960-2965]. However, TMPs such as cobalt phosphide show limited promise as HER catalysts as hydrogen generally binds strongly to TMPs. Further, the reported methods have had limited success in controlling the type, quantity, and distribution of dopants, limiting the performance.

MOFs with their diverse structures and numerous coordination centers have been extensively explored as versatile precursors for preparing TMPs [Weng, B., Grice, C. R., Meng, W., Guan, L., Xu, F., Yu, Y., . . . & Yan, Y. (2018). Metal-organic frameworkderived CoWP@ C composite nanowire electrocatalyst for efficient water splitting. ACS Energy Letters, 3(6), 1434-High temperature calcination is usually necessary to transform TMPs. This process can cause the clustering of metal centers, potentially compromising the original structure of MOFs [Zhao, X., Yang, H., Jing, P., Shi, W., Yang, G., & Cheng, P. (2016). A Metal-Organic Framework Approach toward Highly Nitrogen-Doped Graphitic Carbon as a Metal-Free Photocatalyst for Hydrogen Evolution. Small (Weinheim an der Bergstrasse, Germany), 13(9)].

Further, in the field of electrocatalytic hydrogen production from water, various MOF-based catalysts have been investigated. Cao and coworkers have recently summarized the state of MOFs and their transition metal derivatives for HER [Cao, X., Gao, Y., Li, Y., Weragoda, D. M., Tian, G., Zhang, W., & Chen, B. (2023). Research progress on MOFs and their derivatives as promising and efficient electrode materials for electrocatalytic hydrogen production from water. RSC advances, 13(35), 24393-24411]. Han and coworkers specifically reviewed cobalt-based MOFs and their derivatives for HER [Han, W., Li, M., Ma, Y., & Yang, J. (2020). Cobalt-based metal-organic frameworks and their derivatives for hydrogen evolution reaction. Frontiers in Chemistry, 8, 592915]. In another study, Liu and coworkers used CoP-doped MOF based electrocatalyst for HER carbon cloth (CC) as an electrode material and found that it exhibited a good potential vs reversible hydrogen electrode (RHE) [Liu, T., Li, P., Yao, N., Cheng, G., Chen, S., Luo, W., & Yin, Y. (2019). CoP-doped MOF-based electrocatalyst for pH-universal hydrogen evolution reaction. Angewandte Chemie, 131(14), 4727-4732]. In another study, Wei and coworkers achieved a leaf-like structure by utilizing ZIF-L on carbon cloth nanorods [Wei, Z., Zhu, W., Li, Y., Ma, Y., Wang, J., Hu, N., & Wang, J. (2018). Conductive leaflike cobalt metal-organic framework nanoarray on carbon cloth as a flexible and versatile anode toward both electrocatalytic glucose and water oxidation. Inorganic chemistry, 57(14), 8422-8428]. Wang and coworkers investigated the potential of $CoSe_2$ nanoparticles embedded in MOF-derived Co—N—C nanoflake arrays on CC and showed promise with a notably low overpotential of only 84 mV [Wang, X., He, J., Yu, B., Sun, B., Yang, D., Zhang, X., & Chen, Y. (2019). $CoSe_2$ nanoparticles embedded MOF-derived Co—NC nanoflake arrays as efficient and stable electrocatalyst for hydrogen evolution reaction. Applied Catalysis B: Environmental, 258, 117996].

While MOFs have well defined structures that make them suitable for use as electrocatalysts, there are limitations to their practical applications. Their low stability and poor conductivity, particularly in strong alkaline and acidic solutions, hinder their effectiveness [Qin, J. S., Du, D. Y., Guan, W., Bo, X. J., Li, Y. F., Guo, L. P., . . . & Zhou, H. C. (2015). Ultrastable polymolybdate-based metal-organic frameworks as highly active electrocatalysts for hydrogen generation from water. Journal of the American Chemical Society, 137(22), 7169-7177]. Most importantly, oxygen containing species are more likely to be attracted and held onto by the metal centers in MOFs that have extra space available leading to HER activity that is not satisfied [Zhao, S., Wang, Y., Dong, J., He, C. T., Yin, H., An, P., ... & Tang, Z. (2016). Ultrathin metal-organic framework nanosheets for electrocatalytic oxygen evolution. Nature Energy, 1(12), 1-10].

Even with the present reports of ongoing research, there still exists a need to develop effective electrocatalysts with excellent charge transfer efficiency and electrochemical stability.

Accordingly, it is an objective of the present disclosure to provide an electrocatalyst that overcomes the challenges discussed above.

SUMMARY

According to a first aspect, the present disclosure relates to an electrocatalyst. In some embodiments, the electrocatalyst includes a carbon cloth (CC) substrate, including carbon fibers having a mean diameter of 2.5 to 25 micrometers (μm), and a catalyst disposed on the CC substrate, the catalyst including a conductive metal-organic framework (MOF) including a metal and triazole structural units, and a metal sulfide including the metal disposed on the conductive MOF. In some embodiments, the catalyst is present as structures having a mean size of 2.5 to 25 μm and a surface texture having projections having a mean size of 100 to 500 nanometers (nm).

In some embodiments, the metal is cobalt, and the triazole structural unit is 1,2,4-triazole.

In some embodiments, the electrocatalyst is substantially free of a metal hydroxyfluoride by X-ray diffraction (XRD).

In some embodiments, the catalyst has a sulfur to metal weight ratio of 0.001 to 0.1, and a nitrogen to metal weight ratio of 0.90 to 1.10.

In some embodiments, the conductive MOF is crystalline by XRD.

In some embodiments, the conductive MOF has a mole ratio of the metal to the triazole structural unit of 1:1.5 to 1:2.5.

The present disclosure also relates to a method of forming the electrocatalyst. In some embodiments, the method includes depositing a metal hydroxyfluoride on the CC substrate by reacting a metal nitrate, a fluoride ion source, and urea in water in the presence of the CC substrate at 110 to 135 degrees Celsius (° C.) to form a coated substrate, and converting the metal hydroxyfluoride to the conductive MOF by reacting the coated substrate with flowing triazole vapor at 250 to 300° C. to form an intermediate product. In some embodiments, the method further includes sulfurizing the intermediate product by reacting the intermediate product with flowing sulfur vapor at 225 to 280° C. to form the electrocatalyst.

In some embodiments, the fluoride ion source is ammonium fluoride.

In some embodiments, the metal is cobalt, and the triazole vapor is 1,2,4-triazole vapor.

In some embodiments, the electrocatalyst is substantially free of the metal hydroxyfluoride by XRD.

The present disclosure also relates to a method of electrochemically forming hydrogen gas by a hydrogen evolution reaction (HER). In some embodiments, the method includes contacting the electrocatalyst with an aqueous electrolyte solution including an inorganic acid, and applying a potential of −350 to −1 millivolts (mV) to the electrocatalyst and a counter electrode immersed in the aqueous electrolyte solution.

In some embodiments, the aqueous electrolyte solution including an inorganic acid is 0.5 molar (M) $H_2SO_4$.

In some embodiments, the electrocatalyst has a HER potential required to generate a current density of 10 milliamperes per square centimeter ($mA/cm^2$) ($\eta_{10}$) −210 to −150 mV relative to the reversible hydrogen electrode (RHE).

In some embodiments, the electrocatalyst has a charge transfer resistance of 1 to 20 ohms (Ω).

In some embodiments, the electrocatalyst has a double layer capacitance of 0.2 to 0.4 millifarad per centimeter square ($mF/cm^2$).

The present disclosure also relates to a method of electrochemically forming oxygen gas by an oxygen evolution reaction (OER). In some embodiments, the method includes contacting the electrocatalyst of claim 1 with an aqueous electrolyte solution including an inorganic base, and applying a potential of 50 to 550 mV to the electrocatalyst and a counter electrode immersed in the aqueous electrolyte solution.

In some embodiments, the electrolyte solution including an inorganic base is 1.0 M potassium hydroxide (KOH).

In some embodiments, the electrocatalyst has a OER potential required to generate a current density of 10 $mA/cm^2$ ($\eta_{10}$) 300 to 400 mV relative to the RHE.

In some embodiments, the electrocatalyst has a charge transfer resistance of 0.1 to 3.5Ω. In some embodiments, the electrocatalyst has a double-layer capacitance of 0.2 to 0.4 $mF/cm^2$.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
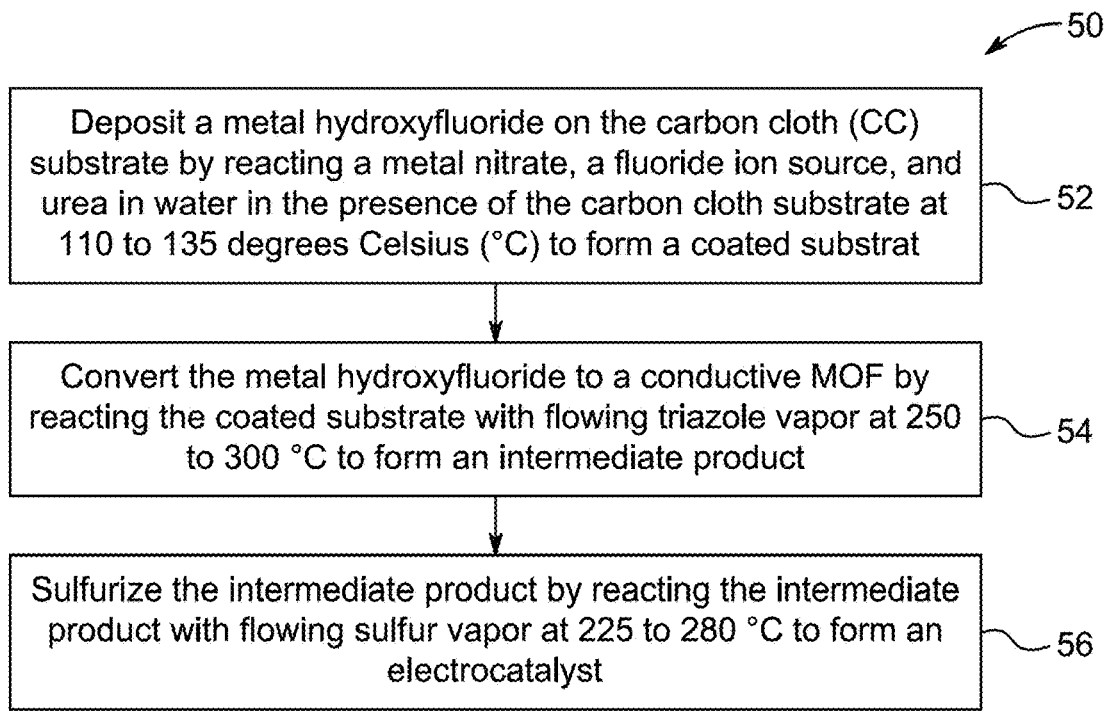
FIG. 1A is a method flowchart for forming an electrocatalyst based on cobalt sulfide (CoS) decorated on conductive cobalt metal-organic framework (Co-MOF) grown on carbon cloth (CC) (CoS/Co-Tri@CC), according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed. Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'nanoparticles (NPs)' refers to particles having a particle size of 1 nanometer (nm) to 1000 nm within the scope of the present invention.

As used herein the term 'disposed' refers to being positioned, placed, deposited, arranged or distributed in a particular manner.

The International Union of Pure and Applied Chemistry (IUPAC) states that a metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

As used herein, the term "aryl", as used herein, and unless otherwise specified, refers to a substituent that is derived from an aromatic hydrocarbon (arene) that has had a hydrogen atom removed from a ring carbon atom. Aryl includes phenyl, biphenyl, naphthyl, anthracenyl, and the like.

The term "alkyl," by itself or as part of another substituent, means, unless otherwise stated, a straight (i.e., unbranched) or branched carbon chain (or carbon), or a combination thereof, which may be fully saturated, mono- or polyunsaturated and can include mono-, di- and multivalent radicals. The alkyl may include a designated number of carbons (e.g., $C_1$-$C_{10}$ means one to ten carbons). In embodiments, the alkyl is fully saturated. In embodiments, the alkyl is monounsaturated. In embodiments, the alkyl is polyunsaturated. Alkyl is an uncyclized chain. Examples of saturated hydrocarbon radicals include, but are not limited to, groups such as methyl, ethyl, n-propyl, isopropyl, n-butyl, t-butyl, isobutyl, sec-butyl, methyl, homologs, and isomers of, for example, n-pentyl, n-hexyl, n-heptyl, n-octyl, and the like. An unsaturated alkyl group has one or more double or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers.

As used herein, the term "cycloalkyl" refers to any univalent radical derived from a cycloalkane by the removal of an atom of hydrogen having C1-C10 carbon atoms.

As used herein, the term "alkoxy" refers to an alkyl group that is singularly bonded to oxygen; thus, R—O, where R has C1-C10 carbon atoms.

As used herein, the term "substituted" refers to at least one hydrogen atom that is replaced with a non-hydrogen group, provided that normal valencies are maintained and that the substitution results in a stable compound. When a group is noted as "optionally substituted", the group may or may not contain non-hydrogen substituents. When present, the substituent(s) may be selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —$SO_2NH_2$), substituted sulfonamide (e.g., —$SO_2$NHalkyl, —$SO_2$NHaryl, —$SO_2$NHarylalkyl, or cases where there are two substituents on one nitrogen selected from alkyl, aryl, or alkylalkyl), nitro, cyano, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted and may be either unprotected, or protected as necessary, as known to those skilled in the art.

As used herein, the term 'optionally substituted alkyl' refers to an alkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) optionally substituted with one or two groups independently selected from alkyl, hydroxyl, alkoxy, alkylsulfonyl, halo, or —CONRR' where R and R' are as defined above.

As used herein, the term 'optionally substituted cycloalkyl' refers to a cycloalkyl group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or heterocyclic (preferably heterocycloamino) optionally substituted with one or two groups independently selected from alkyl, hydroxyl, alkoxy, alkylsulfonyl, halo, or —CONRR' where R and R' are as defined above.

The term 'optionally substituted alkoxy' refers to an alkoxy group which is substituted with one, two, or three substituents independently selected from hydroxyl, alkoxy, carboxy, cyano, alkoxycarbonyl, alkylthio, alkylsulfonyl, halo, haloalkoxy, —CONRR' or —NRR' (where each R is hydrogen, alkyl, hydroxyalkyl, or alkoxyalkyl, and each R' is hydrogen, alkyl, or cycloalkyl) or (preferably heterocycloamino) optionally substituted with one or two groups independently selected from alkyl, hydroxyl, alkoxy, alkylsulfonyl, halo, or —CONRR' where R and R' are as defined above.

As used herein, the term 'optionally substituted arylalkyl group' refers to a structural moiety in organic chemistry that combines an aryl group with an alkyl group, with the option for one or more hydrogen atoms within either or both groups to be replaced by other substituents. The aryl group is a hydrocarbon ring structure derived from benzene, characterized by its alternating single and double bonds. The alkyl group is a hydrocarbon chain structure composed of carbon and hydrogen atoms. When the term 'optionally substituted' is used, it indicates that certain hydrogen atoms within the aryl or alkyl portion of the molecule can be replaced by other functional groups or atoms.

As used herein, the term 'optionally substituted aryl group' refers to a chemical structure consisting of a ring of carbon atoms, typically derived from benzene, with the option for one or more hydrogen atoms on the ring to be replaced by other substituents. Aryl groups are characterized by a delocalized π-electron system resulting from alternating single and double bonds within the ring. The term 'optionally substituted' indicates that the aryl ring may have additional functional groups attached to it.

As used herein, the term 'hydroxyl group' refers to the functional group with the chemical formula —OH and composed of one oxygen atom covalently bonded to one hydrogen atom.

As used herein, the term 'halogen group' refers to the group in the periodic table consisting of six chemically related elements: fluorine (F), chlorine (Cl), bromine (Br), or iodine (I).

As used herein, the term 'amine group' refers to the compound and functional group that contains a basic nitrogen atom with a lone pair. Amines are formally derivatives of ammonia, where one or more hydrogen atoms have been replaced by a substituent such as an alkyl or aryl group. Amine may be a primary amine, secondary or a tertiary amine.

As used herein, the term 'nitro group' refers to the functional group consisting of a nitrogen atom bonded to two oxygen atoms (—$NO_2$). The nitro group is typically electron-withdrawing, influencing the reactivity of the compound.

As used herein, the term 'cyano group' refers to the functional group consisting of a carbon atom triple-bonded to a nitrogen atom (—CN).

As used herein, the term 'electrode' refers to an electrical conductor used to contact a non-metallic part of a circuit, such as a semiconductor, an electrolyte, a vacuum, or air.

As used herein, 'working electrode', refers to an electrode in an electrochemical cell/device/sensor on which the electrochemical reaction of interest is occurring.

As used herein, 'counter-electrode', refers to an electrode used in an electrochemical cell for voltametric analysis or other reactions in which an electric current is expected to flow.

As used herein, the term 'electrolyte' refers to substances that conduct electric current because of dissociation of the electrolyte into positively and negatively charged ions.

As used herein, the term 'current density' refers to the amount of electric current traveling per unit cross-section area.

As used herein, the term 'electrocatalyst' refers to a substance that accelerates the rate of an electrochemical reaction by lowering the activation energy without being consumed in the process.

As used herein, the term 'water splitting' refers to the chemical reaction in which water is broken down into oxygen and hydrogen. Water splitting is usually divided into two components, the hydrogen evolution reaction and the oxygen evolution reaction.

$$2H_2O \rightarrow 2H_2 + O_2 \quad (1)$$

As used herein, the term "hydrogen evolution reaction" (HER) refers to a process in which hydrogen gas ($H_2$) is produced through the reduction of protons ($H^+$) or water ($H_2O$) on the surface of a catalyst, typically under an applied electric potential. The reaction is typically carried out in aqueous solutions, often as part of electrochemical water splitting, where water molecules are split into hydrogen and oxygen gases. The HER is a useful reaction in renewable energy technologies, such as in electrolysis and photoelectrocatalysis, aimed at producing hydrogen as a clean energy carrier. The efficiency of the HER may depend on factors like the choice of catalyst, applied voltage, and reaction conditions.

As used herein, the term "oxygen evolution reaction" (OER) refers to an electrochemical process in which oxygen gas ($O_2$) is produced by the oxidation of water ($H_2O$) or hydroxide ions ($OH^-$) at the anode of an electrochemical cell. This reaction occurs under the application of an external electrical potential and is a critical step in water splitting, electrolysis, and other renewable energy technologies aimed at generating hydrogen. The OER typically involves the transfer of multiple electrons and protons, and it is known to be a kinetically challenging reaction due to the high overpotentials required for efficient oxygen production. The efficiency of the OER may be influenced by factors such as the choice of catalyst, electrode material, and applied voltage.

As used herein, the term 'overpotential' refers to the difference in potential that exists between a thermodynamically determined reduction potential of a half-reaction and the potential at which the redox event is experimentally observed. The term is directly associated with a cell's voltage efficacy. In an electrolytic cell, the occurrence of overpotential implies that the cell needs more energy as compared to that thermodynamically expected to drive a reaction. The quantity of overpotential is specific to each cell design and varies across cells and operational conditions, even for the same reaction. Overpotential is experimentally measured by determining the potential at which a given current density is reached.

As used herein, the term 'double layer capacitance (Ca)' refers to the capacitance that forms at the interface between an electrode and an electrolyte. It is a result of the separation of charge, with one layer of charge accumulating on the electrode surface and the opposite layer forming in the electrolyte, creating an electric double layer.

As used herein, the term 'charge transfer resistance' refers to the resistance to the flow of charge across the interface between an electrode and an electrolyte in an electrochemical reaction.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of naturally occurring nickel $^{28}Ni$ include $^{58}Ni$, $^{60}Ni$, $^{61}Ni$, $^{62}Ni$, and $^{64}Ni$. Isotopes of oxygen include $^{16}O$, $^{17}O$, and $^{18}O$ and isotopes of cobalt (Co) are $^{56}Co$, $^{57}Co$, $^{58}Co$, and $^{60}Co$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to an electrocatalyst. In some embodiments, the electrocatalyst includes a carbon cloth (CC) substrate including carbon fibers and a catalyst disposed on the CC substrate, the catalyst including a conductive metal-organic framework (MOF) including a metal and triazole structural units, and a metal sulfide including the metal disposed on the conductive MOF.

In general, CC refers to carbon fiber-based material. The carbon fibers can be present as individual fibers, or can be grouped or arranged into yarns, filaments, threads, and the like. The carbon fibers (or groupings thereof) can be formed into a textile-like material. The textile-like material can be woven or non-woven. The CC can be advantageous for providing a large surface area, high electrical conductivity, mechanical strength, and chemical stability. In some embodiments, the carbon substrate can also include a carbon nanomaterial selected from the group including graphite, reduced graphene oxide, carbon nanotubes, carbon black, acetylene black, and graphene. In some embodiments, the carbon substrate can also include a metal foam. Examples of suitable metal foams include, but are not limited to, aluminum foam, nickel foam, titanium foam, titanium alloy foam, aluminum alloy foam, magnesium alloy foam, nickel alloy foam, and steel foam.

In some embodiments, carbon fibers have a mean diameter of 2.5 to 25 micrometers (μm). For example, the carbon fibers can have a mean diameter of 2.5 μm, 3.0 μm, 3.5 μm, 4.0 μm, 4.5 μm, 5.0 μm, 5.5 μm, 6.0 μm, 6.5 μm, 7.0 μm, 7.5 μm, 8.0 μm, 8.5 μm, 9.0 μm, 9.5 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, or 25 μm. In some embodiments, carbon fibers have a mean diameter of 13 to 14 μm.

The catalyst further includes a conductive MOF including a conductive MOF including a metal and triazole structural units. MOFs include a structure of metal nodes interconnected by organic linkers to thereby define a network of pores. These nano-sized porous materials with suitable ligands can offer a favorable environment to host diverse guest species. The precisely shaped pores of MOFs can enable or facilitate the capture and confinement of guest molecules or ions within the structures. The conductive nature of these MOFs may be enhanced by incorporating conductive ligands or metal centers that improve electron mobility.

In some embodiments, the metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In some embodiments, the metal ion is an ion of at least one metal selected from the group consisting of Zn, Cu, Fe, Ni, Co, Mn, Cr, Cd, Mg, Ca, and Zr. In some embodiments, the metal ion is Co. In some embodiments, the metal ion is $Co^{2+}$.

In general, in a metal organic framework, the organic ligands must meet certain requirements to form coordination bonds, such as being multi-dentate, having at least two donor atoms (i.e. N—, and/or O—), and being neutral or anionic. The structure of the metal organic framework is also affected by the shape, length, and functional groups present in the organic linker. For example, the organic ligands may be triazole-based, imidazolate-based, di-, tri-, and tetra-carboxylic acid-based, and ligands similar to a triazole or imidazole including, but not limited to, optionally substituted triazoles, optionally substituted benzimidazoles or benzotriazoles, optionally substituted imidazolines, optionally substituted pyrazoles, optionally substituted thiazoles, and optionally substituted triazoles.

In some embodiments, the MOF includes an organic ligand that includes a triazole structural unit. For example, the organic ligand that includes a triazole structural unit can be an optionally substituted 1,2,3-triazole, an optionally substituted 1,2,4-triazole, an optionally substituted benzotriazole. Such substituted triazoles can be a triazole core containing various substituents such as an optionally substituted alkyl, an optionally substituted cycloalkyl, an optionally substituted alkoxy, a hydroxyl group, a halogen group, an amine group, a nitro group, and a cyano group. In some embodiments, the triazole structural unit is 1,2,4-triazole.

In some embodiments, the conductive MOF has a mole ratio of the metal to the triazole structural unit of 1:1.5-1:2.5. For example, the MOF may have a mole ratio of the metal to the triazole structural unit of 1:1.50, 1:1.55, 1:1.60, 1:1.65, 1:1.70, 1:1.75, 1:1.80, 1:1.85, 1:1.90, 1:1.95, 1:2.0, 1:2.05, 1:2.10, 1:2.15, 1:2.20, 1:2.25, 1:2.30, 1:2.35, 1:2.40, 1:2.45, or 1:2.50.

In some embodiments, the conductive MOF is crystalline by X-ray diffraction (XRD). The crystalline structure may be advantageous for ensuring consistent and efficient electron or ion conductivity and/or for improving the performance of MOF in various electrochemical applications. In some embodiments, the conductive MOF is amorphous by XRD.

In some embodiments, the metal sulfide is disposed on the conductive MOF in the form of particles. In some embodiments, the metal sulfide particles cover at least 50%, preferably 55%, preferably 60%, preferably 65%, preferably 70%, preferably 75%, preferably 80%, preferably 85%, preferably 90%, and preferably at least 95% of the conductive MOF.

In some embodiments, the catalyst is present as structures having a mean size of 2.5 to 25 µm. For example, the structures can have a mean size of 2.5 µm, 3.0 µm, 3.5 µm, 4.0 µm, 4.5 µm, 5.0 µm, 5.5 µm, 6.0 µm, 6.5 µm, 7.0 µm, 7.5 µm, 8.0 µm, 8.5 µm, 9.0 µm, 9.5 µm, 10 µm, 11 µm, 12 µm, 13 µm, 14 µm, 15 µm, 16 µm, 17 µm, 18 µm, 19 µm, 20 µm, 21 µm, 22 µm, 23 µm, 24 µm, or 25 µm.

In general, the structures can be any shape known to one of ordinary skill in the art. Examples of suitable shapes the structures may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), belts (also known as nanobelts), ribbons (also known as nanoribbons), and mixtures thereof. In the case of nanorods, the rod shape may be defined by a ratio of a rod length to a rod width, the ratio being known as the aspect ratio. For structures of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the structures have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of structures having a different shape. As used herein, the term "non-uniform shape" refers to an average consistent shape that differs by more than 10% of the distribution of structures having a different shape. In one embodiment, the shape is uniform and at least 90% of the structures are spherical or substantially circular, and less than 10% are polygonal. In another embodiment, the shape is non-uniform and less than 90% of the structures are spherical or substantially circular, and greater than 10% are polygonal.

In some embodiments, the structures of the present disclosure are monodisperse, having a coefficient of variation or relative standard deviation, expressed as a percentage and defined as the ratio of the particle size standard deviation (o) to the particle size mean (u) multiplied by 100 of less than 25%, preferably less than 10%, preferably less than 8%, preferably less than 6%, preferably less than 5%, preferably less than 4%, preferably less than 3%, preferably less than 2%. In some embodiments, the structures of the present disclosure are monodisperse having a particle size distribution ranging from 80% of the average particle size to 120% of the average particle size, preferably 90-110%, preferably 95-105% of the average particle size. In some embodiments, the structures are not monodisperse.

In some embodiments, the structures have a surface texture having projections having a mean size of 100-500 nanometers (nm). For example, the projections can have a mean size of 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, or 500 nm.

In some embodiments, the structures are present as aggregates of the conductive MOF and the metal sulfide. In some embodiments, the aggregates are disposed along a length of the carbon fibers. In some embodiments, the aggregates are present as isolated aggregates. In some embodiments, the aggregates are present as a dense coating of adjacent and/or overlapping aggregates. In some embodiments, the aggregates have a coral-like structure that includes the projections disposed on an aggregate body. In some embodiments, the projections include the metal sulfide. In some embodiments, the aggregate body includes the conductive MOF. In some embodiments, the aggregates have a mean size that is larger than the mean diameter of the carbon fibers. In some embodiments, an individual aggregate does not encompass an entirety of a circumference of the carbon fiber on which the aggregate is disposed.

In some embodiments, the catalyst has a sulfur to metal weight ratio of 0.001 to 0.1. For example, the catalyst can have a sulfur to metal weight ratio of 0.001, 0.005, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, or 0.1.

In some embodiments, the catalyst has a nitrogen to metal weight ratio of 0.90-1.10. For example, the catalyst can have a nitrogen to metal weight ratio of 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, or 1.10.

The present disclosure also relates to a method of forming the electrocatalyst. FIG. 1A illustrates a flow chart of a method 50 of forming the electrocatalyst. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes depositing a metal hydroxyfluoride on the CC substrate by reacting a metal nitrate, a fluoride ion source, and urea in water in the presence of the CC substrate to form a coated substrate. In some embodiments, the reacting is performed at a temperature of 110 to 135 degrees Celsius (° C.), preferably 111 to 134° C., preferably 112 to 133° C., preferably 113 to 132° C., preferably 114 to 131° C., preferably 115 to 130° C., preferably 116 to 129° C., preferably 117 to 128° C., preferably 118 to 127° C., preferably 119 to 126° C., preferably 120 to 125° C., preferably 121 to 124° C., and preferably 122 to 123° C.

In some embodiments, the metal is cobalt and the metal nitrate is cobalt nitrate ($Co(NO_3)_2 \cdot 6H_2O$). In general, the fluoride ion source can be any suitable fluoride ion source known to one of ordinary skill in the art. Examples of fluoride ion sources include, but are not limited to, sodium fluoride (NaF), potassium fluoride (KF), hydrofluoric acid (HF), calcium fluoride ($CaF_2$), ammonium fluoride ($NH_4F$), and fluorosilicic acid ($H_2SiF_6$). In some embodiments, the fluoride ion source is $NH_4F$.

At step 54, the method 50 includes converting the metal hydroxyfluoride to the conductive MOF by reacting the coated substrate with flowing triazole vapor to form an intermediate product. In some embodiments, the converting is performed at a temperature of 250 to 300° C., preferably 255 to 295° C., preferably 260 to 290° C., preferably 265 to 285° C., preferably 270 to 280° C. In some embodiments, the intermediate product is substantially free of the metal hydroxyfluoride. That is, the converting completely converts the metal hydroxyfluoride to the conductive MOF.

At step 56, the method 50 includes sulfurizing the intermediate product by reacting the intermediate product with flowing sulfur vapor to form the electrocatalyst. In some embodiments, the sulfurizing is performed at a temperature of 225 to 280° C., preferably 230 to 275° C., preferably 235 to 270° C., preferably 240 to 265° C., preferably 245 to 260° C., preferably 250 to 255° C. In some embodiments, the electrocatalyst is substantially free of the metal hydroxyfluoride by XRD.

Figure 1B:
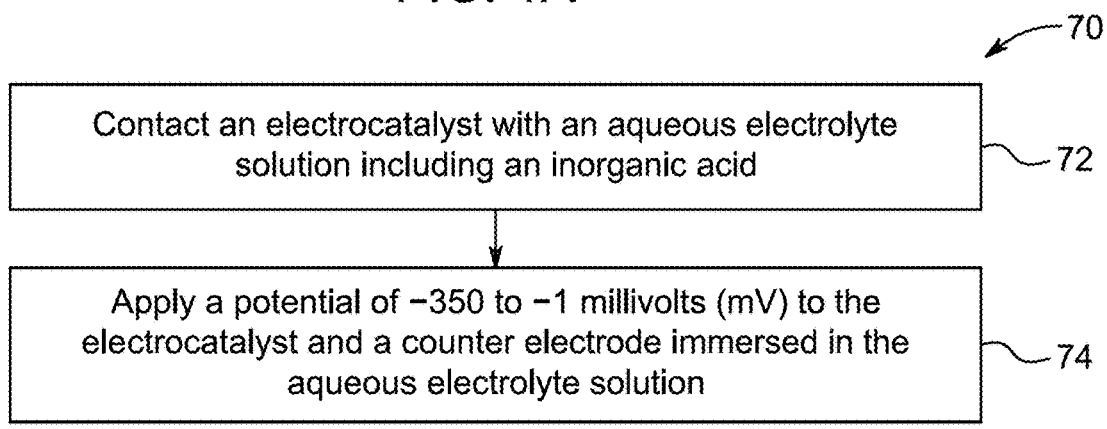
FIG. 1B is a method flowchart for of electrochemically forming hydrogen gas by a hydrogen evolution reaction (HER), according to certain embodiments.

The present disclosure also relates to a method of electrochemically forming hydrogen gas using the electrocatalyst. FIG. 1B illustrates a flow chart of a method 70 of electrochemically forming hydrogen gas by a hydrogen evolution reaction (HER). The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes contacting the electrocatalyst with an aqueous electrolyte solution including an inorganic acid. In general, the inorganic acid can be any suitable inorganic acid known to one of ordinary skill in the art. Examples of inorganic acids include, but are not limited to, hydrochloric acid (HCl), sulfuric acid ($H_2SO_4$), nitric acid ($HNO_3$), phosphoric acid ($H_3PO_4$), and hydrofluoric acid (HF). In some embodiments, the concentration of the inorganic acid in the electrolyte solution is about 0.05 to 5 molar (M), preferably 0.1 to 4 M, preferably 0.2 to 3 M, preferably 0.3 to 2.0 M, preferably 0.4 to 1.0 M, and preferably 0.45 to 0.75 M, preferably 0.5 M. In some embodiments, the aqueous electrolyte solution is 0.5 M $H_2SO_4$. In general, the water may be tap water, distilled water, bidistilled water, deionized water, deionized distilled water, reverse osmosis water, and/or some other water. In some embodiment, the water is deionized water.

In some embodiments, to maintain uniform concentrations and/or temperatures of the electrolyte solution, the electrolyte solution may be stirred or agitated during the step of the subjecting. The stirring or agitating may be done intermittently or continuously. This stirring or agitating may be done by a magnetic stir bar, a stirring rod, an impeller, a shaking platform, a pump, a sonicator, a gas bubbler, or some other device. Preferably, the stirring is done by an impeller or a magnetic stir bar.

At step 74, the method 70 includes applying a potential of −350 to −1 millivolts (mV) relative to the reversible hydrogen electrode (RHE) to the electrocatalyst and a counter electrode immersed in the aqueous electrolyte solution. For example, the potential may be −350 mV, −340 mV, −330 mV, −320 mV, −310 mV, −300 mV, −290 mV, −280 mV, −270 mV, −260 mV, −250 mV, −240 mV, −230 mV, −220 mV, −210 mV, −200 mV, −190 mV, −180 mV, −170 mV, −160 mV, −150 mV, −140 mV, −130 mV, −120 mV, −110 mV, −100 mV, −90 mV, −80 mV, −70 mV, −60 mV, −50 mV, −40 mV, −30 mV, −20 mV, −10 mV, or −1 mV relative to the reversible hydrogen electrode (RHE). In some embodiments, the electrocatalyst has a HER potential required to generate a current density of 10 milliamperes per square centimeter ($mA/cm^2$) ($\eta_{10}$) of −210 to −150 mV, preferably −200 to −160 mV, preferably −190 to −170 mV relative to the reversible hydrogen electrode (RHE).

In some embodiments, the counter electrode is made from a material selected from the group consisting of platinum, gold, and carbon. In some embodiments, the counter electrode may contain an electrically-conductive material such as platinum, platinum-iridium alloy, iridium, titanium, titanium alloy, stainless steel, gold, cobalt alloy, and/or some other electrically-conductive material, where an 'electrically-conductive material' as defined here is a substance with an electrical resistivity of at most $10^{-6}$ ohm meter ($\Omega \cdot m$), preferably at most $10^{-7}$ $\Omega \cdot m$, more preferably at most $10^{-8}$ $\Omega \cdot m$ at a temperature of 20 to 25° C. The form of the counter electrode may be generally relevant only in that it needs to supply sufficient current to the electrolyte solution to support the current required for the electrochemical reaction of interest. The counter electrode material should thus be sufficiently inert to withstand the chemical conditions in the electrolyte solution, such as acidic or basic pH values, without substantially degrading during the electrochemical reaction. The counter electrode should preferably not leach out any chemical substance that interferes with the electrochemical reaction or might lead to undesirable electrode contamination.

In some embodiments, the electrochemical cell further includes a reference electrode in contact with the electrolyte solution. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper (II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, mercury/mercuric oxide (Hg/HgO) electrode, or some other type of electrode. However, in some embodiments, the electrochemical cell does not include a reference electrode.

In some embodiments, the electrocatalyst has a charge transfer resistance of 1 to 20Ω, preferably 2 to 18Ω, preferably 3 to 16Ω, preferably 4 to 14Ω, preferably 5 to 12Ω, preferably 6 to 10Ω, preferably 7 to 8Ω. In some embodiments, the electrocatalyst has a double layer capacitance of 0.2 to 0.4 millifarad per centimeter square (mF/cm$^2$), preferably 0.21 to 0.39 mF/cm$^2$, preferably 0.22 to 0.38 mF/cm$^2$, preferably 0.23 to 0.37 mF/cm$^2$, preferably 0.24 to 0.36 mF/cm$^2$, preferably 0.25 to 0.35 mF/cm$^2$, preferably 0.26 to 0.34 mF/cm$^2$, preferably 0.27 to 0.33 mF/cm$^2$, preferably 0.28 to 0.32 mF/cm$^2$, and preferably 0.29 to 0.31 mF/cm$^2$.

Figure 1C:
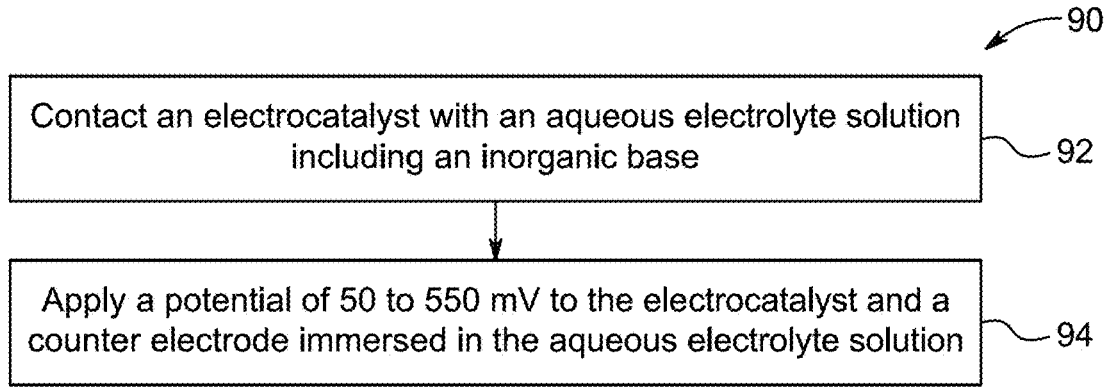
FIG. 1C is a method flowchart for of electrochemically forming hydrogen gas by an oxygen evolution reaction (OER), according to certain embodiments.

The present disclosure also relates to a method of electrochemically forming oxygen gas using the electrocatalyst. FIG. 1C illustrates a flow chart of a method 90 of electrochemically forming oxygen gas by an oxygen evolution reaction (OER). The order in which the method 90 is described is not intended to be construed as a limitation, and any number of the described method steps can be combined in any order to implement the method 90. Additionally, individual steps may be removed or skipped from the method 90 without departing from the spirit and scope of the present disclosure.

At step 92, the method 90 includes contacting the electrocatalyst with an aqueous electrolyte solution including an inorganic base. In general, the inorganic base can be any suitable inorganic base known to one of ordinary skill in the art. Examples of inorganic bases include, but are not limited to, alkaline earth metal hydroxides such as beryllium hydroxide ($Be(OH)_2$), magnesium hydroxide ($Mg(OH)_2$), strontium hydroxide ($Sr(OH)_2$), and calcium hydroxide ($Ca(OH)_2$) and alkali metal hydroxides such as lithium hydroxide (LiOH), sodium hydroxide (NaOH), potassium hydroxide (KOH) and rubidium hydroxide (RbOH), and cesium hydroxide (CsOH). In some embodiments, the concentration of the inorganic base in the electrolyte solution is about 0.05 to 5 molar (M), preferably 0.1 to 4 M, preferably 0.2 to 3 M, preferably 0.3 to 2.0 M, preferably 0.5 to 1.5 M, and preferably 0.75 to 1.25 M, preferably 1.0 M. In some embodiments, the electrolyte solution including an inorganic base is 1.0 M KOH.

At step 94, the method 90 includes applying a potential of 50 to 550 mV relative to the reversible hydrogen electrode (RHE) to the electrocatalyst and a counter electrode immersed in the aqueous electrolyte solution. For example, the potential may be 50 mV, 60 mV, 70 mV, 80 mV, 90 mV, 100 mV, 110 mV, 120 mV, 130 mV, 140 mV, 150 mV, 160 mV, 170 mV, 180 mV, 190 mV, 200 mV, 210 mV, 220 mV, 230 mV, 240 mV, 250 mV, 260 mV, 270 mV, 280 mV, 290 mV, 300 mV, 310 mV, 320 mV, 330 mV, 340 mV, 350 mV, 360 mV, 370 mV, 380 mV, 390 mV, 400 mV, 410 mV, 420 mV, 430 mV, 440 mV, 450 mV, 460 mV, 470 mV, 480 mV, 490 mV, or 500 mV.

In some embodiments, the electrocatalyst has an OER potential required to generate a current density of 10 mA/cm$^2$ ($\eta 10$) 300 of 400 mV, preferably 310 to 390 mV, preferably 320 to 380 mV, preferably 330 to 370 mV, preferably 340 to 360 mV relative to the RHE.

In some embodiments, the space above each electrode may be confined to a vessel to receive or store the evolved gases from one or both electrodes. In some embodiments, the collected gas may be further processed, filtered, or compressed. Preferably, the $H_2$-enriched gas is collected above the cathode, and the $O_2$-enriched gas is collected above the anode. In some embodiments, electrolytic cell, or an attachment, may be shaped so that the headspace above the working electrode is kept separate from the headspace above the reference electrode. In some embodiments, the $H_2$-enriched gas and the $O_2$-enriched gas are not 100 vol % $H_2$ and 100 vol % $O_2$, respectively. For example, the enriched gases may also include $N_2$ from the air, water vapor, and other dissolved gases from the electrolyte solution. In some embodiments, the $H_2$-enriched gas may also include $O_2$ from the air. In some embodiments, the $H_2$-enriched gas may include greater than 20 vol % $H_2$, preferably greater than 40 vol % $H_2$, more preferably greater than 60 vol % $H_2$, and even more preferably greater than 80 vol % $H_2$, relative to a total volume of the receptacle collecting the evolved $H_2$ gas. In some embodiments, the $O_2$-enriched gas may include greater than 20 vol % $O_2$, preferably greater than 40 vol % $O_2$, more preferably greater than 60 vol % $O_2$, and even more preferably greater than 80 vol % $O_2$, relative to a total volume of the receptacle collecting the evolved $O_2$ gas. In some embodiments, the evolved gases may be bubbled into a vessel, including water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

In some embodiments, the electrocatalyst has a charge transfer resistance of 0.1 to 3.5Ω, preferably 0.2 to 3.4Ω, preferably 0.3 to 3.3Ω, preferably 0.4 to 3.2Ω, preferably 0.5 to 3.1Ω, preferably 0.6 to 3.0Ω, preferably 0.7 to 2.9Ω, preferably 0.8 to 2.8Ω, preferably 0.9 to 2.7Ω, preferably 1.0 to 2.6Ω, preferably 1.1 to 2.5Ω, preferably 1.2 to 2.4Ω, preferably 1.3 to 2.3Ω, preferably 1.4 to 2.2Ω, preferably 1.5 to 2.1Ω, preferably 1.6 to 2.0Ω, and preferably 1.7 to 1.9Ω.

In some embodiments, the electrocatalyst has a double layer capacitance of 0.2 to 0.4 mF/cm$^2$, preferably 0.21 to 0.39 mF/cm$^2$, preferably 0.22 to 0.38 mF/cm$^2$, preferably 0.23 to 0.37 mF/cm$^2$, preferably 0.24 to 0.36 mF/cm$^2$, preferably 0.25 to 0.35 mF/cm$^2$, preferably 0.26 to 0.34 mF/cm$^2$, preferably 0.27 to 0.33 mF/cm$^2$, preferably 0.28 to 0.32 mF/cm$^2$, and preferably 0.29 to 0.31 mF/cm$^2$.

The electrocatalyst may be advantageous for exhibiting good charge transfer efficiency and improved electrochemical stability. These properties may make the electrocatalyst advantageous for use in water-splitting applications.

EXAMPLES

The following examples demonstrate an electrocatalyst based on cobalt sulfide (CoS) decorated on conductive cobalt metal-organic framework (Co-MOF) grown on carbon cloth (CC) (CoS/Co-Tri@CC). The examples are provided solely for illustration and are not to be construed as limitations of the present disclosure, as many variations thereof are possible without departing from the spirit and scope of the present disclosure.

Example 1: Methodology

The electrocatalyst was prepared according to the following protocol. The first step was the preparation of cobalt hydroxide fluoride (Co(OH)F) arrays grown on CC. This was achieved by dispersing 1 millimoles (mmol) cobalt (II) nitrate hexahydrate ($Co(NO_3)_2 \cdot 6H_2O$), 5 mmol ammonium fluoride ($NH_4F$), and 5 mmol urea ($CH_4N_2O$) into 10 milliliters (mL) of deionized water. A piece of carbon cloth (2 cm×2 cm) was then immersed in the solution in a Teflon-lined stainless-steel autoclave and kept at 120 degrees Celsius (C) for 8 hours (h). The products were then washed with deionized water and dried in a vacuum at 60° C.

The next step involved the preparation of cobalt triazolate (Co-Tri) arrays grown on carbon felt (CF), which was achieved by converting the Co(OH)F arrays to Co-Tri arrays in a tubular furnace at 280° C. for 2 h under a nitrogen ($N_2$) flow. A quartz tube with a diameter of 2.5 centimeter (cm) and a length of 10 cm was used as the reaction vessel, with triazole placed on the upstream side and Co(OH)F (2 cm×2 cm) on the downstream side.

Following this, cobalt sulfide (CoS)/Co-Tri@CC was prepared by using Co-Tri@CC and sulfur powder(S). Sulfur powder was placed on the upstream side, while Co-Tri (2 cm×2 cm) was placed on the downstream side. The reaction vessel, sealed with tin foil, was heated to 260° C. with a heating rate of 2° C./min and maintained at that temperature for 2 h under a $N_2$ flow.

Example 2: Electrocatalyst Characterization

Figure 2A:
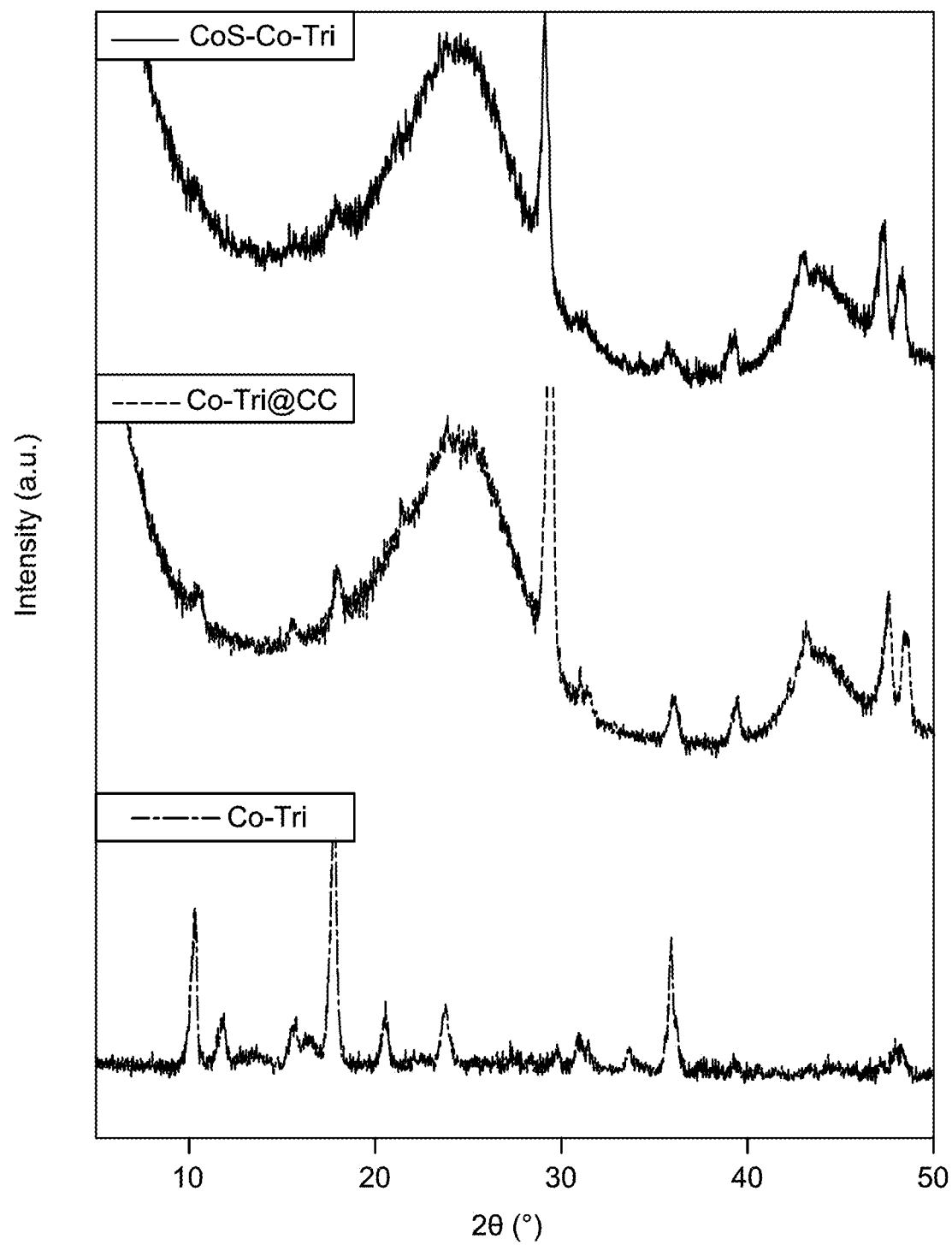
FIG. 2A shows powder X-ray diffraction (PXRD) patterns of cobalt triazolate (Co-Tri) powder, Co-Tri grown on CC (Co-Tri@CC) and CoS/Co-Tri@CC, according to certain embodiments.

The powder X-ray diffraction (PXRD) pattern was obtained to confirm the formation of the triazole MOF onto the surface of the CC. As shown in FIG. 2A, the bottom trace shows the sharp crystalline reflection of the prepared Co-triazole powder which revealed an excellent agreement with the reported Co-triazole XRD data. The middle trace for the Co-Tri@CC confirmed the existence of MOF peaks beside the CC reflections. After the doping of the sulfur no change in the structure of the MOF was observed (top trace) and the structure was intact.

Figure 2B:
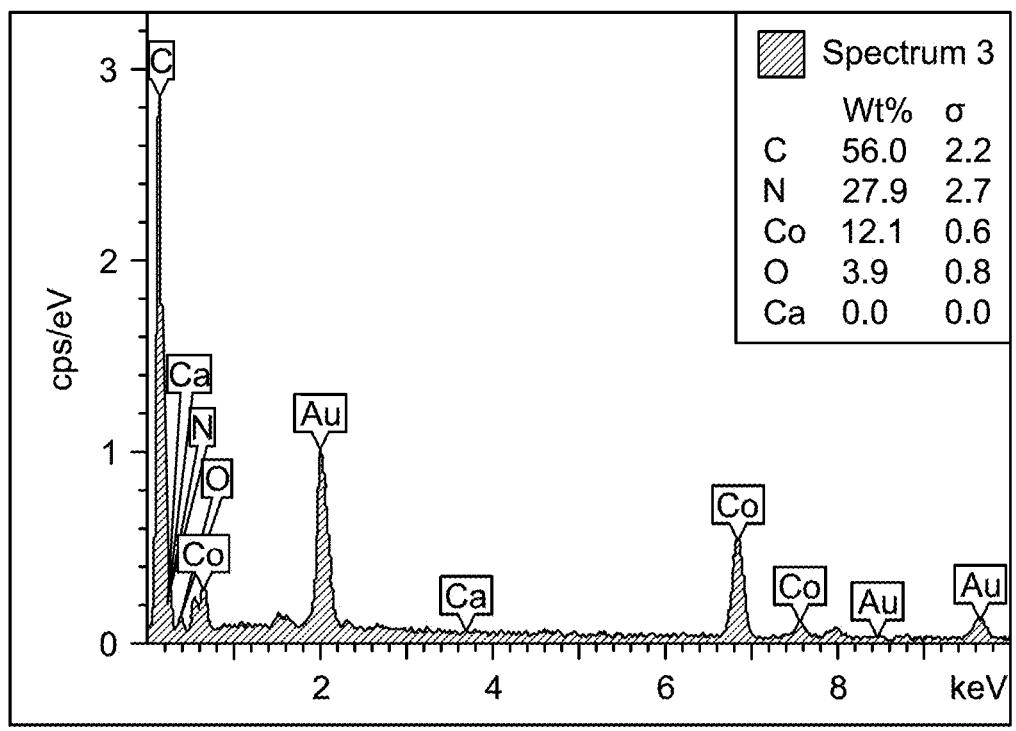
FIG. 2B is an energy-dispersive X-ray (EDX) spectrum of Co-Tri@CC, according to certain embodiments.
Figure 2C:
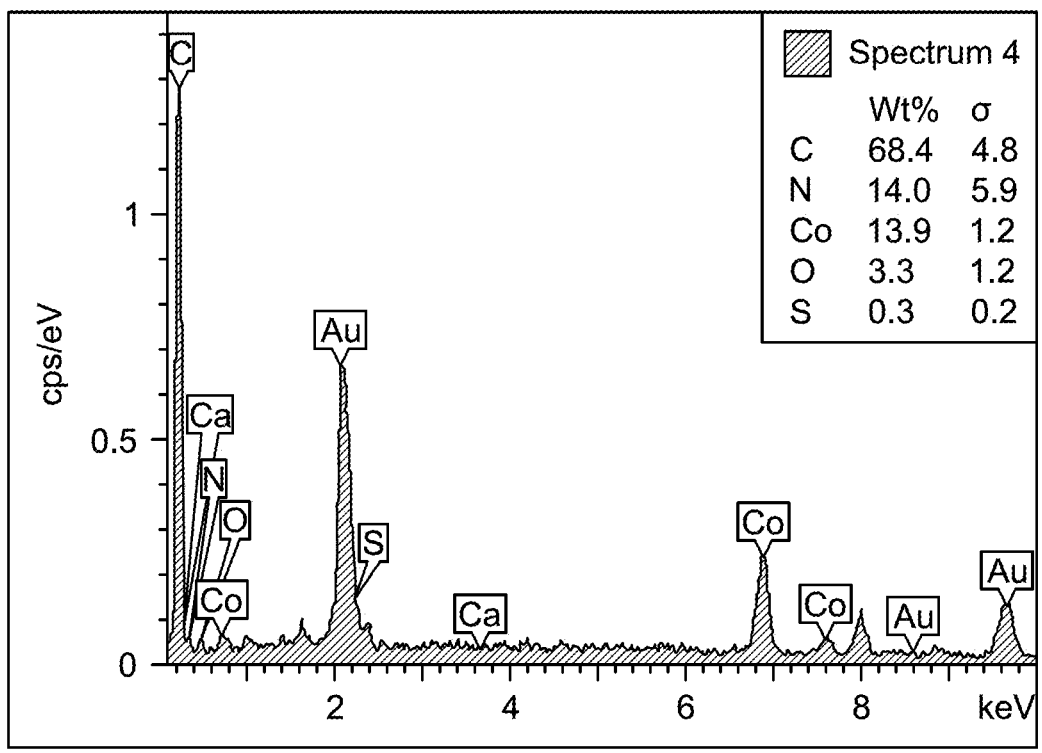
FIG. 2C is an EDX spectrum of CoS/Co-Tri@CC, according to certain embodiments.
Figure 3A:
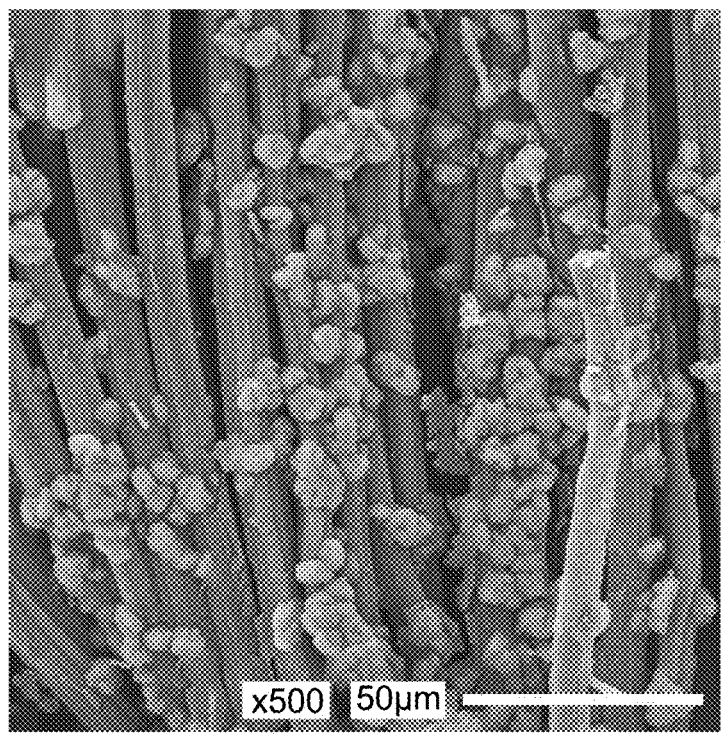
FIG. 3A is a scanning electron microscopy (SEM) image of Co-Tri@CC at 50 micrometers (μm) magnification, according to certain embodiments.
Figure 3B:
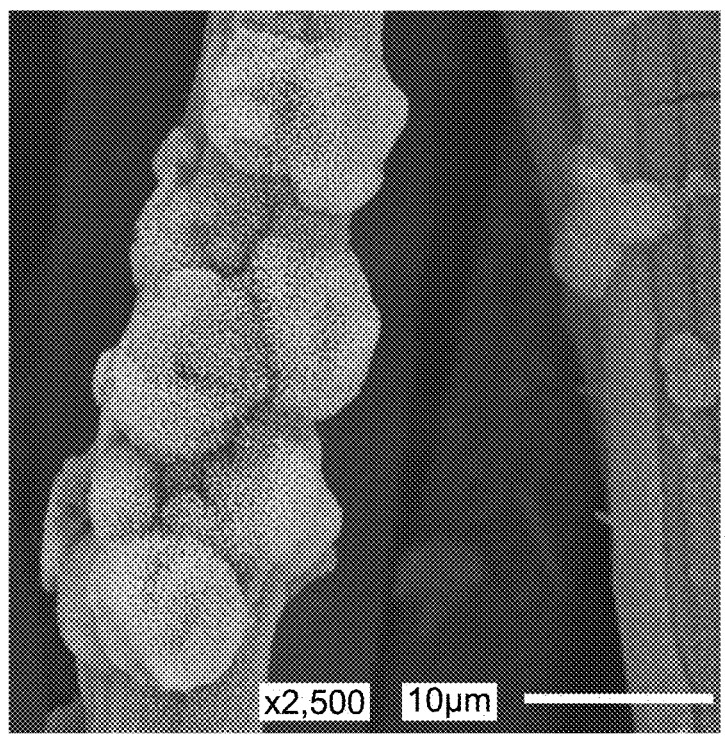
FIG. 3B is a magnified SEM image of Co-Tri@CC, according to certain embodiments.
Figure 3C:
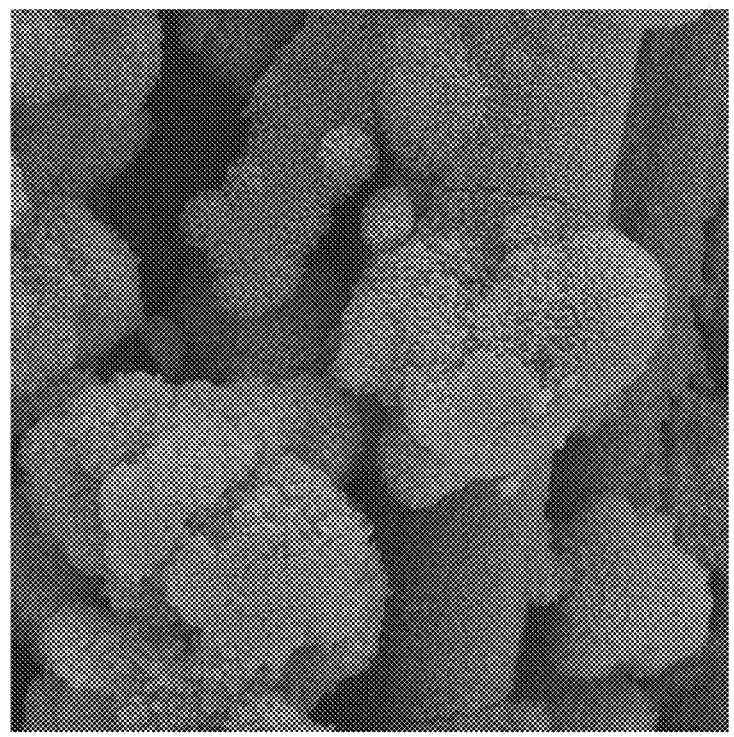
FIG. 3C is a SEM image of Co-Tri@CC at 10 μm magnification, at 10 μm magnification, according to certain embodiments.
Figure 3D:
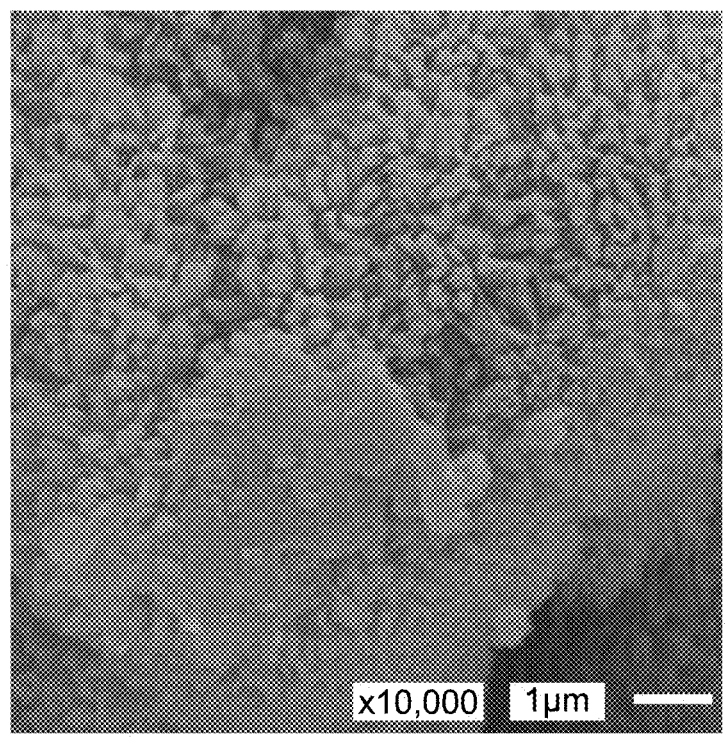
FIG. 3D is a SEM image of CoS/Co-Tri@CC at 1 μm magnification, according to certain embodiments.

FIG. 2B is an energy-dispersive X-ray (EDX) spectrum of Co-Tri@CC and FIG. 2C is an EDX spectrum of CoS/Co-Tri@CC. The EDX analysis measured the elemental ratios, with FIG. 2B presenting the ratio of elements and FIG. 2C indicating that the sulfur-to-cobalt (S: Co) ratio in the CoS/Co-Tri@CC was approximately 0.2%. The scanning electron microscopy (SEM) images of Co-Tri@CC in FIGS. 3A-3C reveal nanocrystalline spikes grown on the carbon cloth, corresponding to the Co-Tri MOF. After sulfurization of the Co-Tri@CC to form CoS/Co-Tri@CC, no significant changes in morphology were observed as shown in FIG. 3D.

Figure 4A:
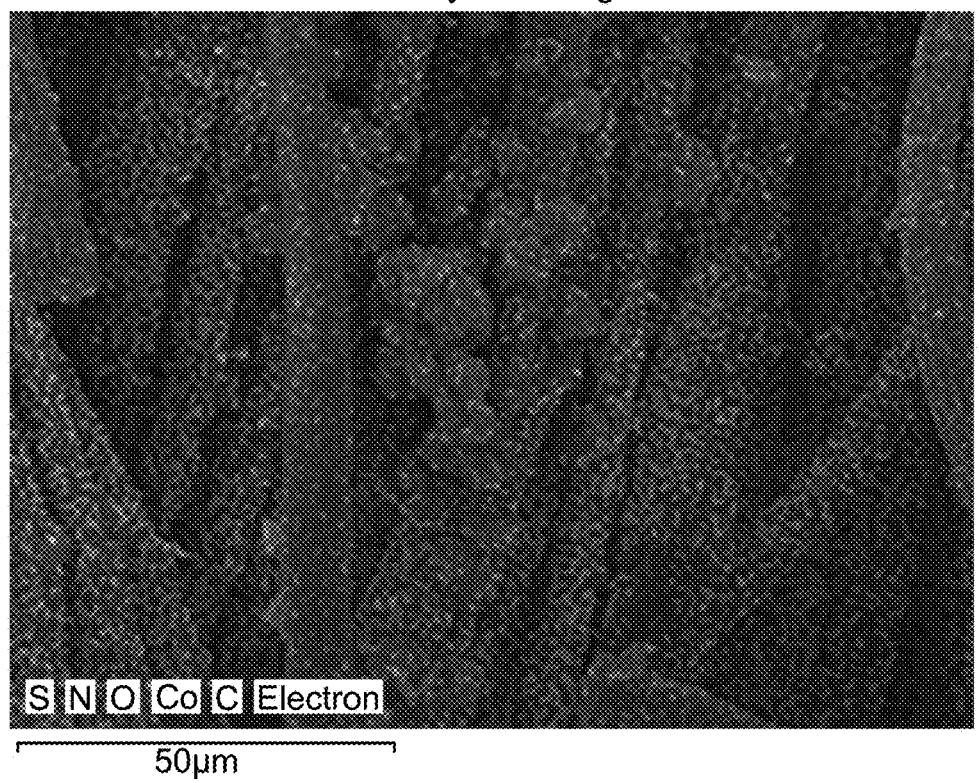
FIG. 4A is an EDX elemental map of CoS/Co-Tri@CC, according to certain embodiments.
Figure 4B:
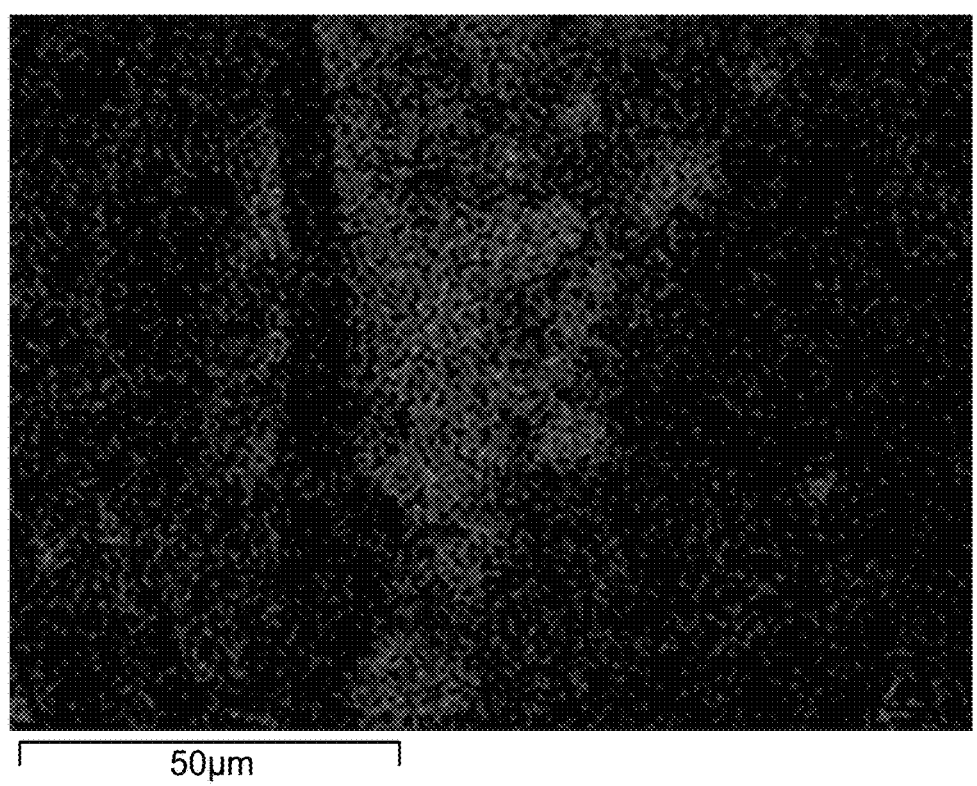
FIG. 4B is an EDX elemental mapping image of cobalt (Co) corresponding to CoS/Co-Tri@CC, according to certain embodiments.
Figure 4C:
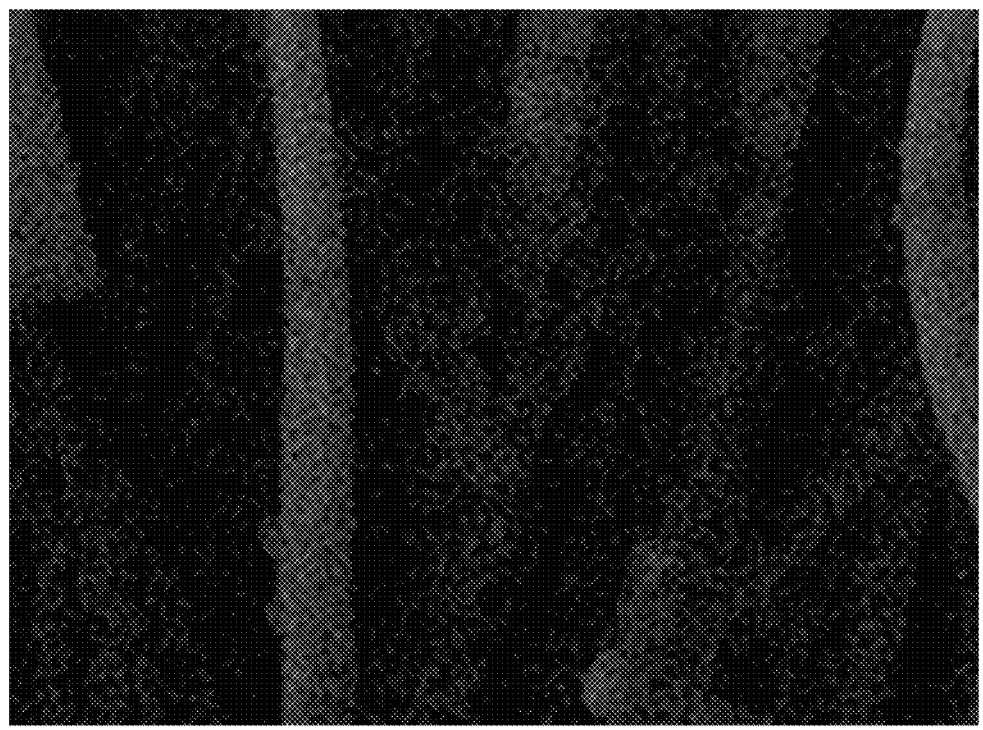
FIG. 4C is an EDX elemental mapping image of carbon (C) corresponding to CoS/Co-Tri@CC, according to certain embodiments.
Figure 4D:
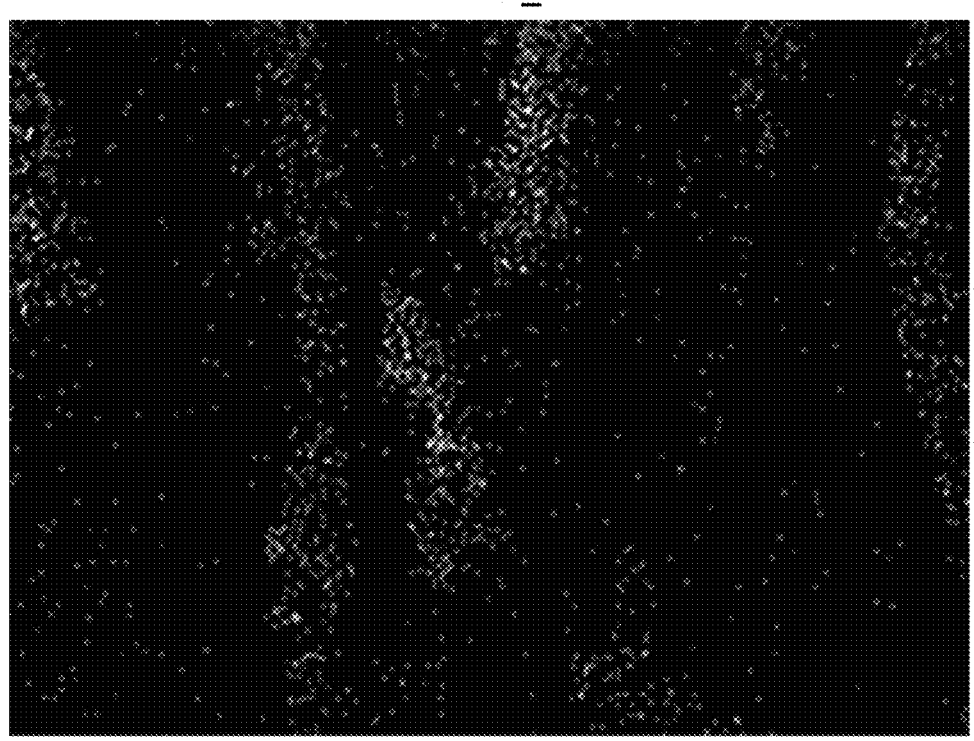
FIG. 4D is an EDX elemental mapping image of nitrogen (N) corresponding to CoS/Co-Tri@CC, according to certain embodiments.
Figure 4E:
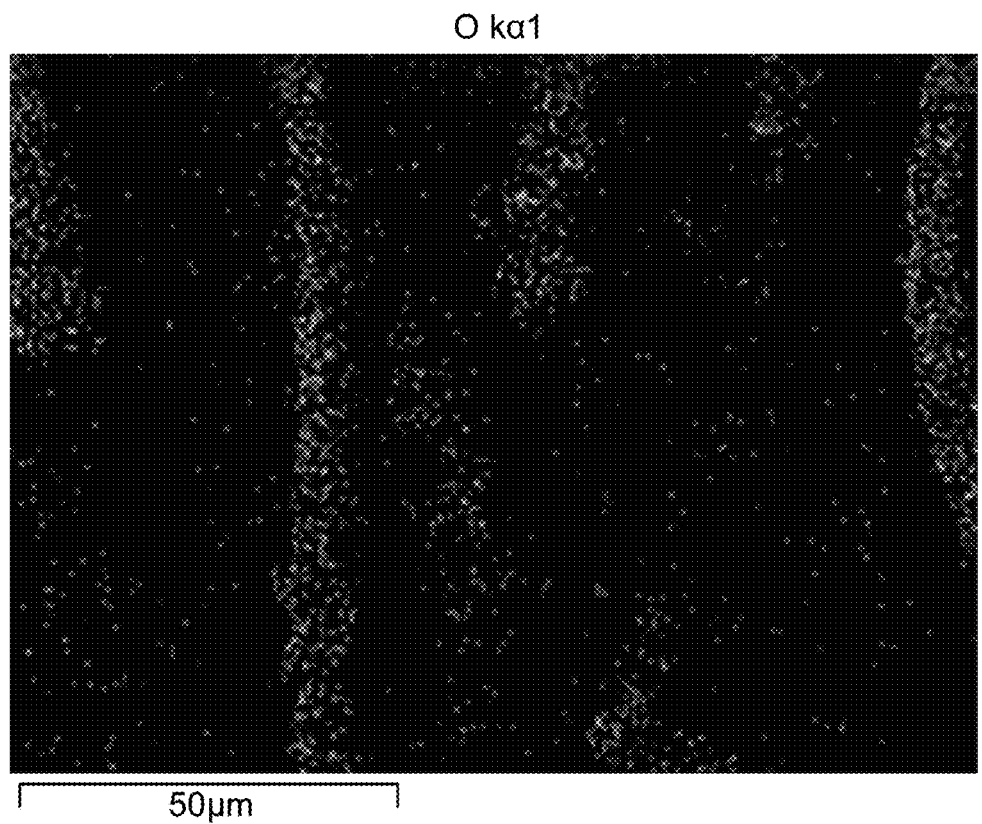
FIG. 4E is an EDX elemental mapping image of oxygen (O) corresponding to CoS/Co-Tri@CC, according to certain embodiments.
Figure 4F:
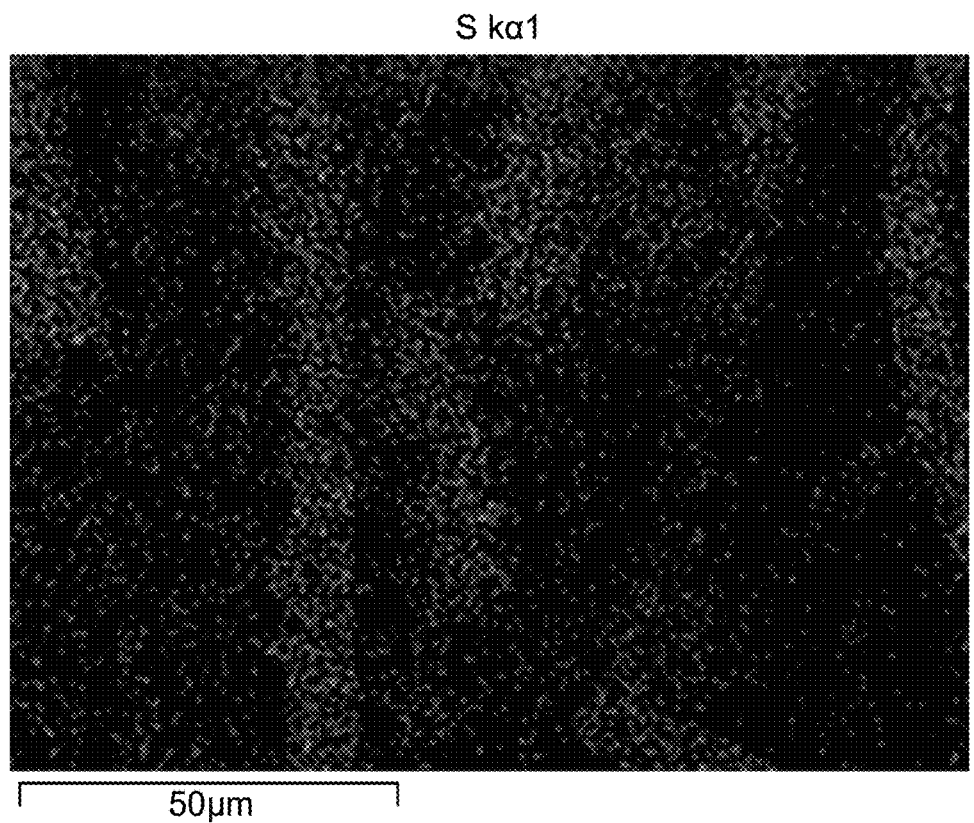
FIG. 4F is an EDX elemental mapping image of sulfur(S) corresponding to CoS/Co-Tri@CC, according to certain embodiments.
Figure 5A:
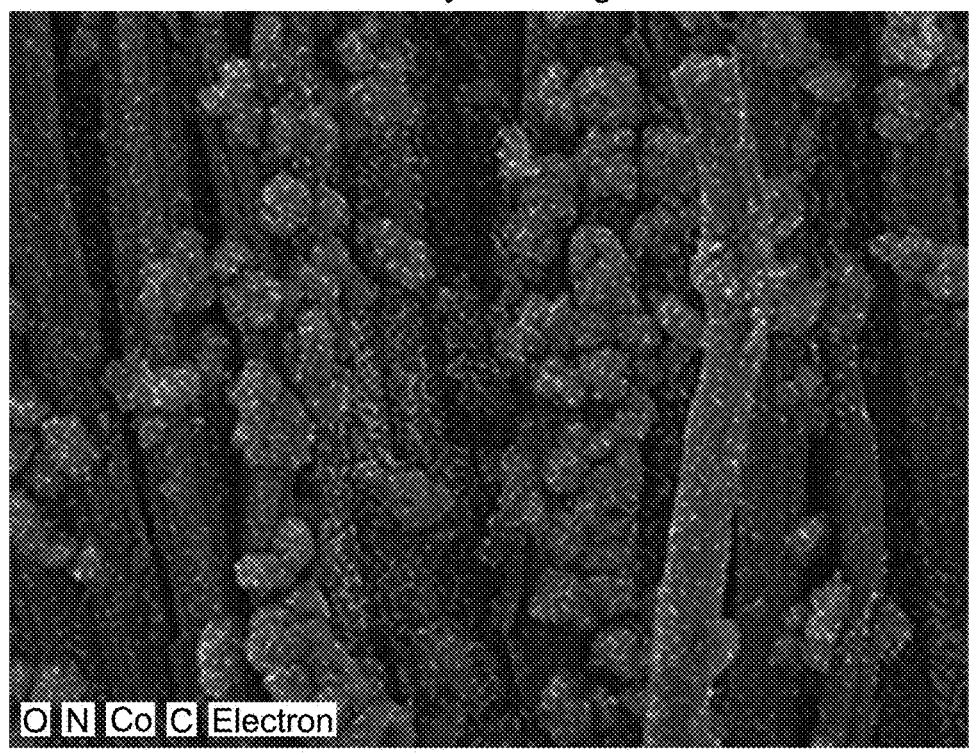
FIG. 5A is an EDX elemental map of Co-Tri@CC, according to certain embodiments.
Figure 5B:
FIG. 5B is an EDX elemental mapping image of C corresponding to Co-Tri@CC, according to certain embodiments.
Figure 5C:
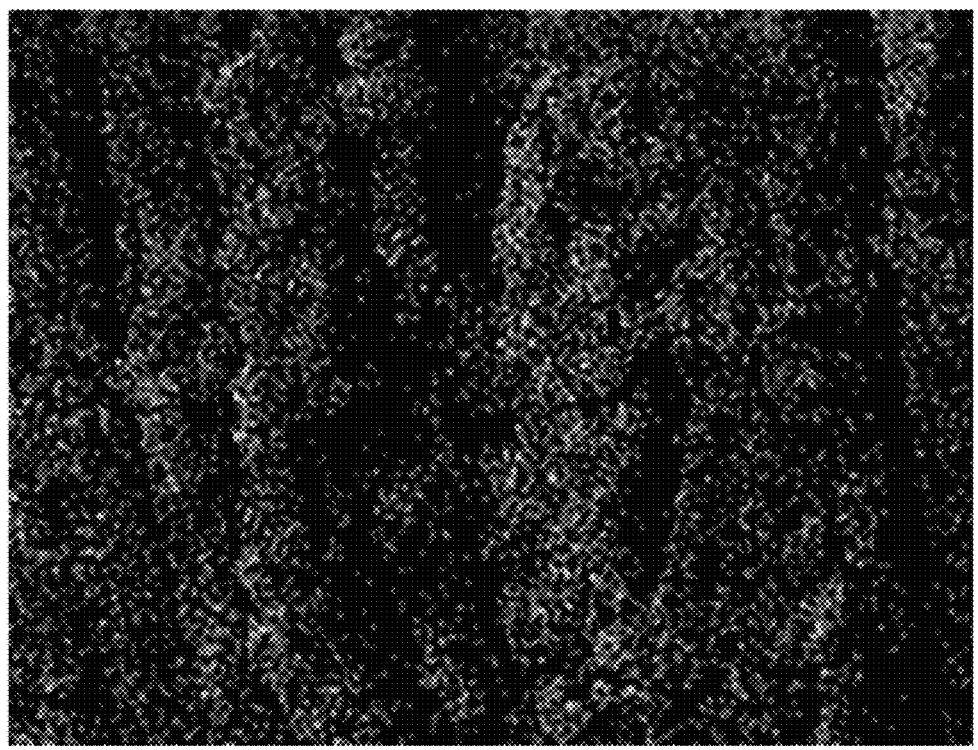
FIG. 5C is an EDX elemental mapping image of N corresponding to Co-Tri@CC, according to certain embodiments.
Figure 5D:
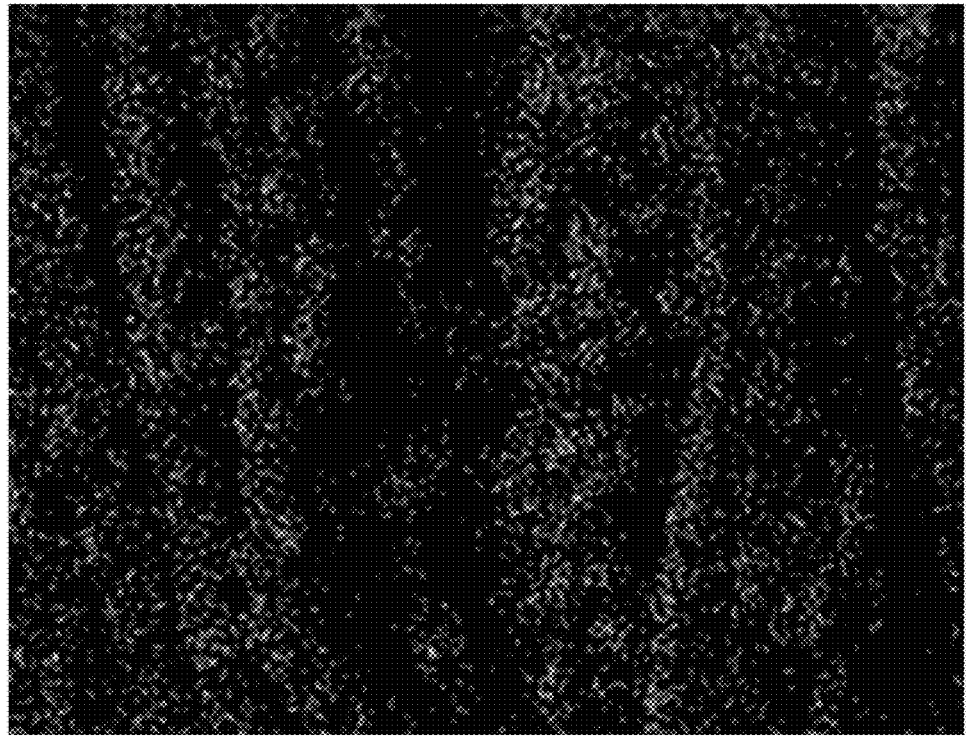
FIG. 5D is an EDX elemental mapping image of O corresponding to Co-Tri@CC, according to certain embodiments.
Figure 5E:
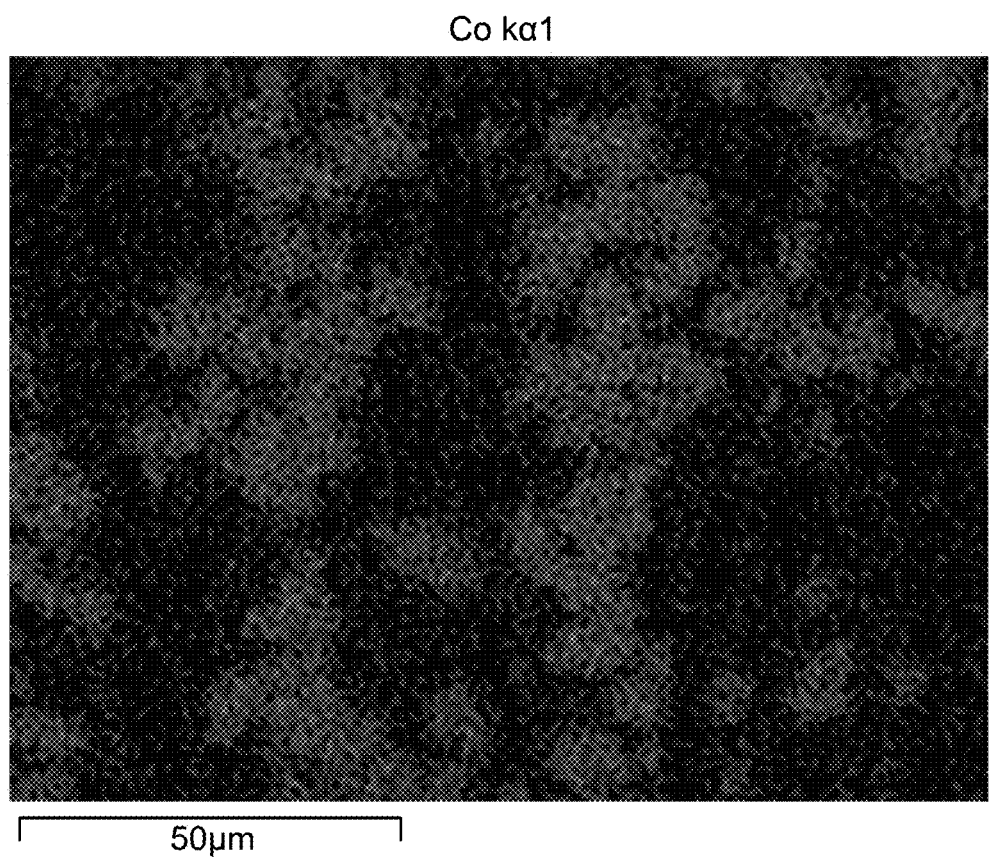
FIG. 5E is an EDX elemental mapping image of Co corresponding to Co-Tri@CC, according to certain embodiments.

FIG. 4A is an EDX elemental map of CoS/Co-Tri@CC and FIG. 4B-4F show the elemental mapping images showing the presence of cobalt (Co), carbon (C), nitrogen (N), oxygen (O), and sulfur (S), respectively. FIG. 5A is an EDX elemental map of CoS/Co-Tri@CC and FIG. 5B-5E show the elemental mapping images showing the presence of confirm the presence of C, N, O, and Co, respectively.

Example 3: Electrochemical Performance

Figure 6A:
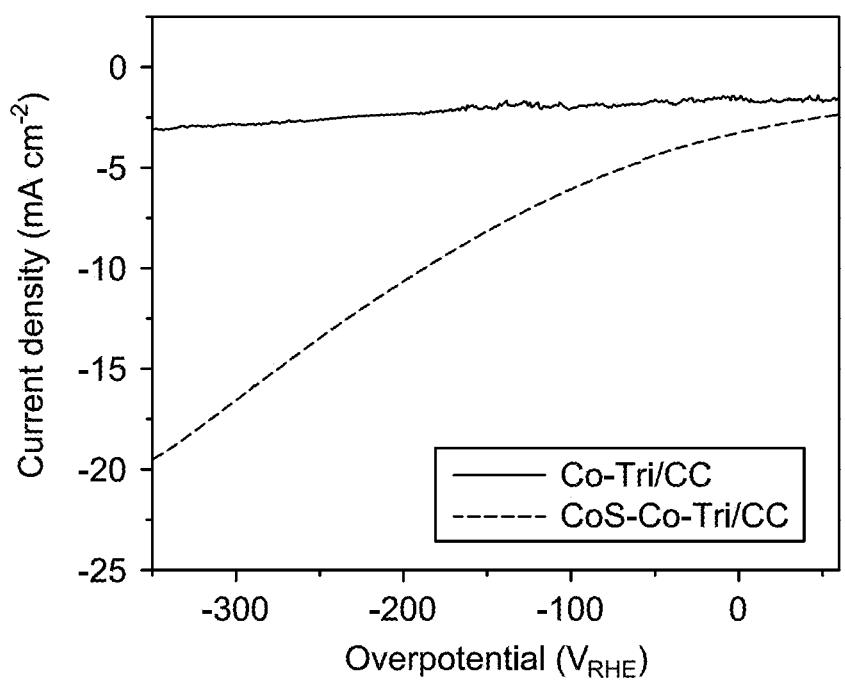
FIG. 6A is a cathodic linear sweep voltammetry (LSV) curve of Co-Tri@CC and CoS/Co-Tri@CC in 1.0 molar (M) potassium hydroxide (KOH) electrolyte, according to certain embodiments.
Figure 6B:
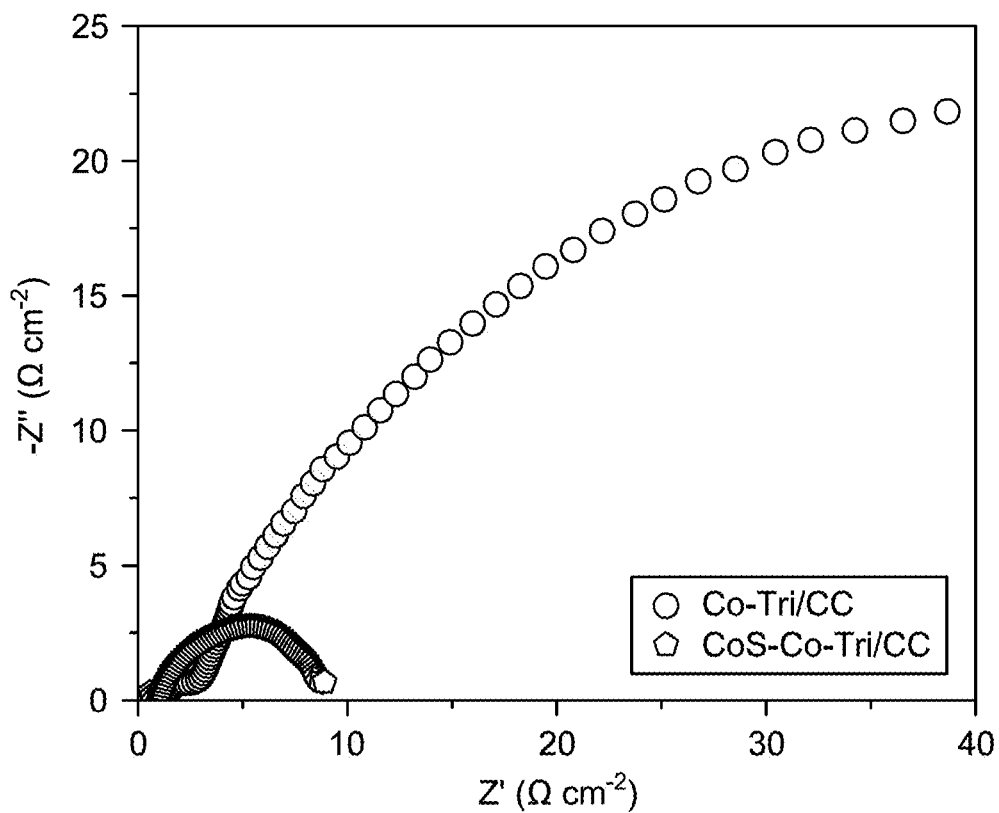
FIG. 6B is an electrochemical impedance spectroscopy (EIS) of Co-Tri@CC and CoS/Co-Tri@CC in 1.0 M KOH electrolyte, according to certain embodiments.

The electrochemical water splitting was tested for hydrogen evolution reaction (HER) and oxygen evolution reaction (OER). The HER was investigated in 0.5 molar (M) sulfuric acid ($H_2SO_4$) as shown in FIG. 6A, which illustrates cathodic linear sweep voltammetry (LSV) curves. To achieve a current density of 10 milliampere per square centimeter ($mA/cm^2$), the CoS/Co-Tri@CC material required an overpotential of −180 millivolt (mV). On the other hand, the Co-Tri@CC material did not exhibit any activity in relation to the hydrogen evolution process. The electrochemical impedance spectroscopy (EIS) for HER, as shown in FIG. 6B, is consistent with the LSV results and indicates that CoS/Co-Tri@CC has the lowest resistance and highest charge transfer of only 10 ohms ($\Omega$), which is significantly lower than the observed 90 ohm ($\Omega$) from Co-Tri@CC. The EIS is used to indicate the rapid transfer rate of electrons during HER.

Figure 7A:
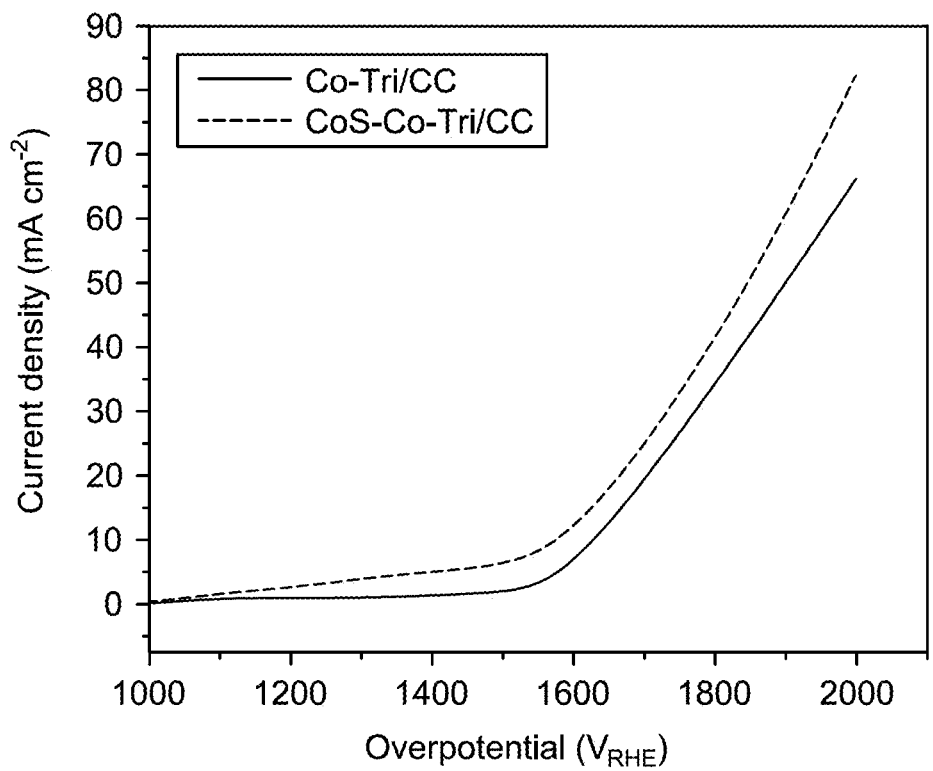
FIG. 7A is an anodic LSV of Co-Tri@CC and CoS/Co-Tri@CC in 1.0 M KOH electrolyte, according to certain embodiments.
Figure 7B:
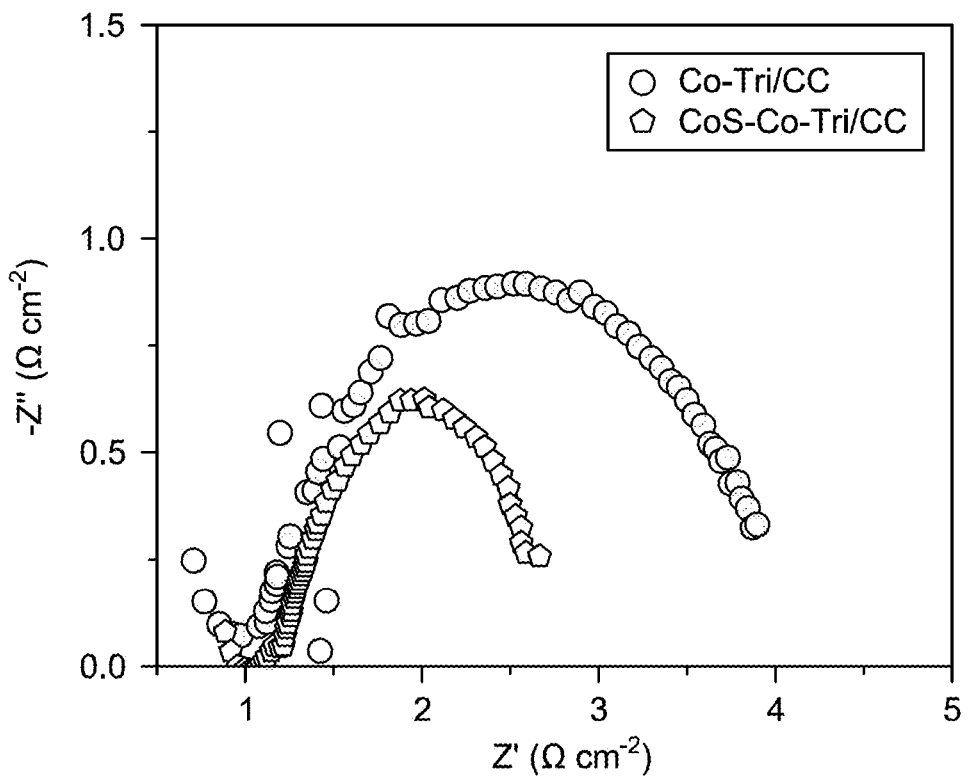
FIG. 7B is an EIS of Co-Tri@CC and CoS/Co-Tri@CC in 1.0 M KOH electrolyte, according to certain embodiments.

For the OER (FIG. 7A), the LSV curve performed in 1.0 M potassium hydroxide (KOH) for CoS/Co-Tri@CC shows an overpotential (to derive 10 $mA/cm^2$) of approximately 350 mV, which is significantly lower than the overpotential of around 420 mV observed for Co-Tri@CC. This suggests that the CoS/Co-Tri@CC catalyst is more efficient in catalyzing the OER, requiring less energy to drive the reaction. FIG. 7B shows the EIS of the OER, indicating that Co-Tri@CC has the lowest charge transfer rate, followed by CoS/Co-Tri@CC, which is consistent with the LSV results.

Figure 8A:
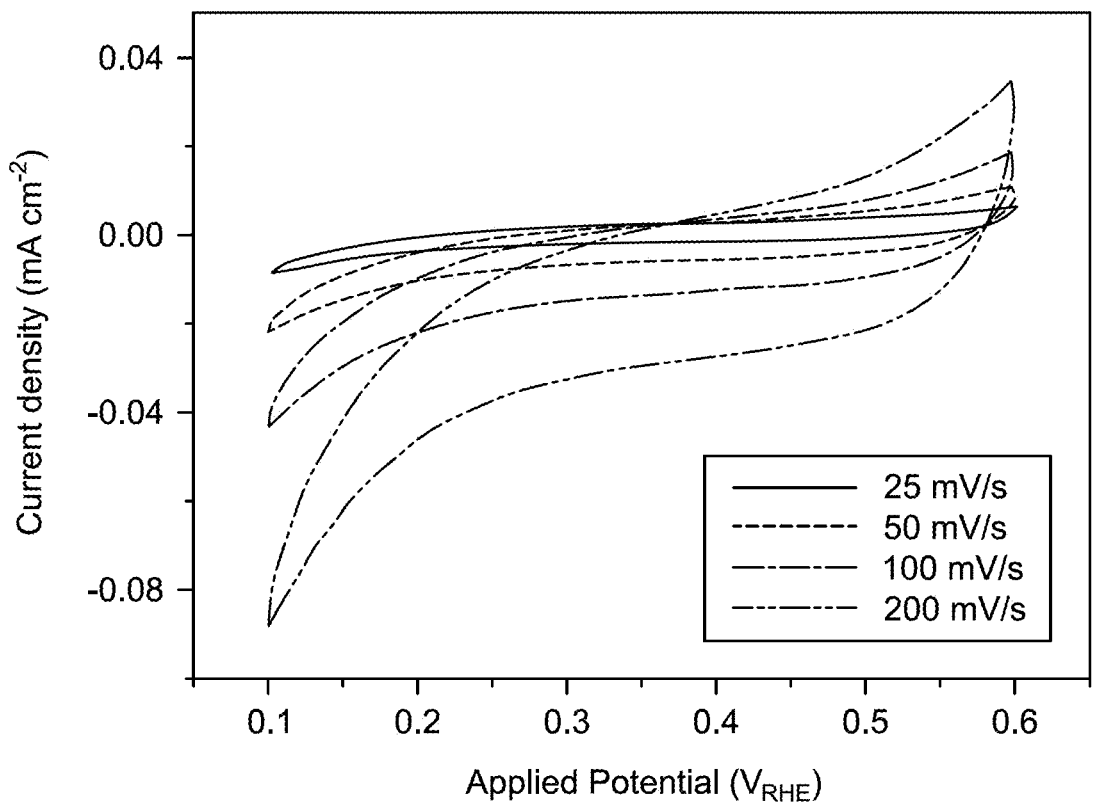
FIG. 8A is a cyclic voltammetry (CV) curve for Co-Tri@CC electrode performed at different scan speeds in 1.0 M KOH electrolyte, according to certain embodiments.
Figure 8B:
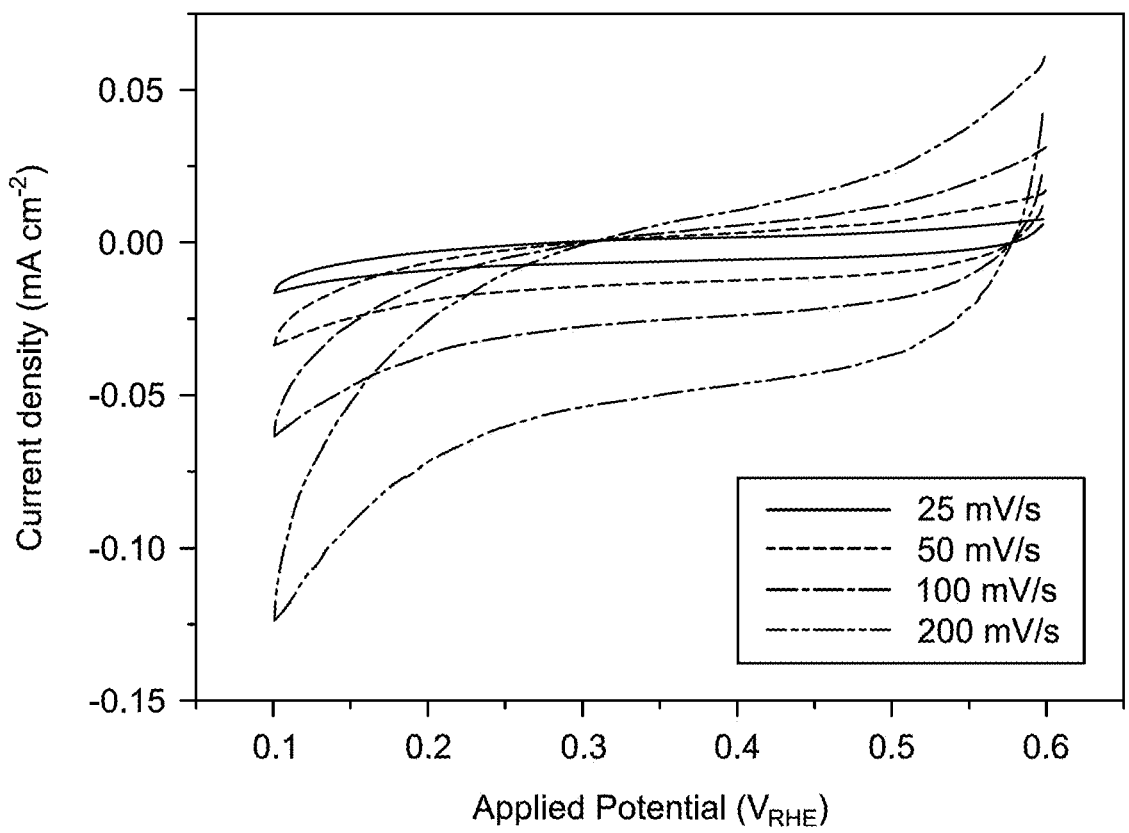
FIG. 8B is a CV curve for CoS/Co-Tri@CC electrode performed at different scan speeds in 1.0 M KOH electrolyte, according to certain embodiments.
Figure 8C:
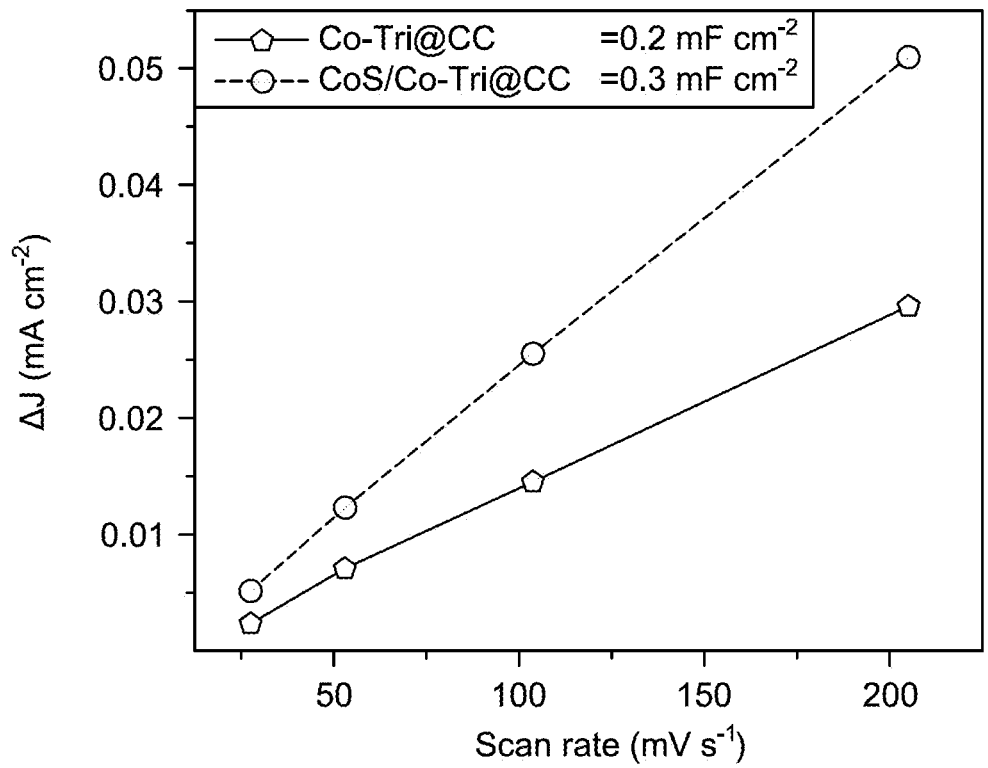
FIG. 8C is a plot calculating double layer capacitance Cal slopes for Co-Tri@CC and CoS/Co-Tri@CC electrode in 1.0 M KOH electrolyte, according to certain embodiments.
Figure 8D:
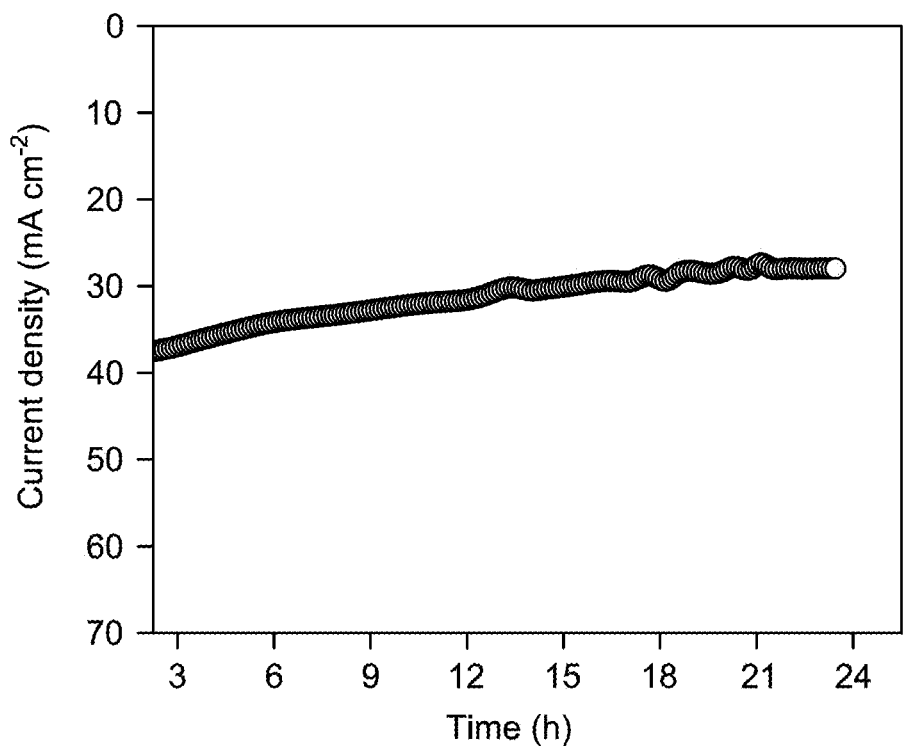
FIG. 8D is an electrode stability curve of CoS/Co-Tri@CC for OER, according to certain embodiments.
Figure 8E:
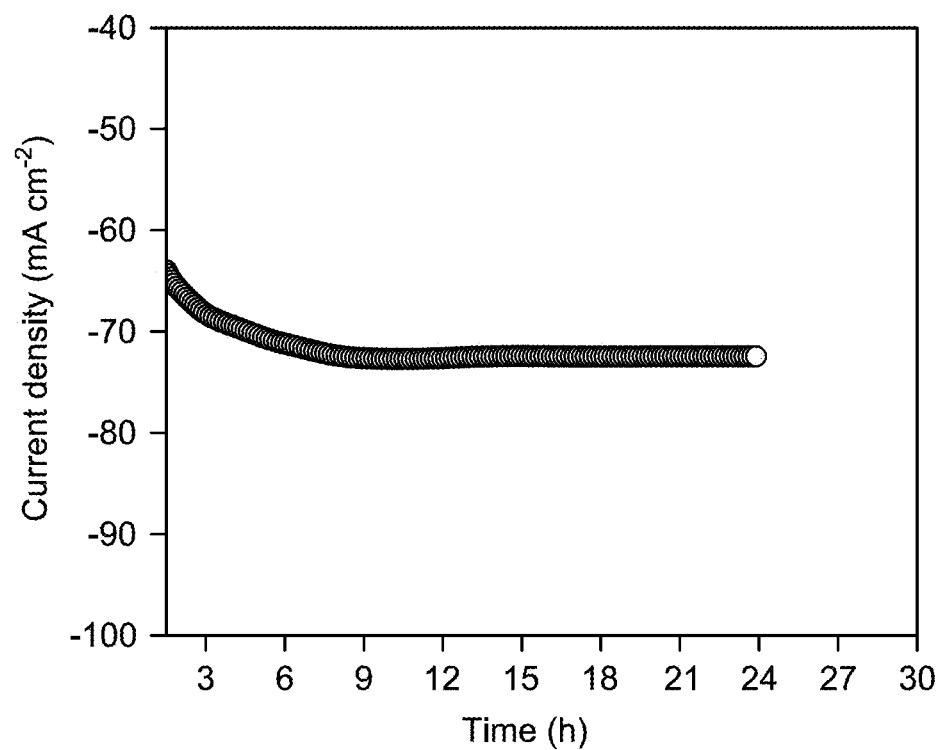
FIG. 8E is an electrode stability curve of CoS/Co-Tri@CC for HER, according to certain embodiments.

To estimate the electrochemical active surface area, the double layer capacitance ($C_{dl}$) was calculated by recording cyclic voltammetry (CV) of Co-Tri@CC and CoS/Co-Tri@CC, respectively, as shown in FIG. 8A-8B at different scan rates. The Ca slopes were calculated for Co-Tri@CC and CoS/Co-Tri@CC to be 0.2 and 0.3 millifarad per centimeter square ($mF/cm^2$), respectively, as shown in FIG. 8C. FIGS. 8D-8E show electrode stability curves of Co-Tri@CC and CoS/Co-Tri@CC for OER and HER, respectively. The electrode durability was investigated at 40 mA for 24 h in 1 M KOH. For HER, the electrode remained stable for 24 h at a current density of −50 $mA/cm^2$. The current-time curves showed excellent stability during the experimental time.

The produced CoS/Co-Tri@CC showed improved electrocatalytic activity for the efficient generation of hydrogen via the HER and generation of oxygen via the OER.

Numerous modifications and variations of the present disclosure are possible in light of the above teachings. Therefore, it is to be understood that within the scope of the appended claims, the invention may be practiced other than as specifically described herein.

The invention claimed is:
1. An electrocatalyst, including:
   a carbon cloth (CC) substrate including carbon fibers having a mean diameter of 2.5 to 25 micrometer (μm); and
   a catalyst disposed on the CC substrate, the catalyst including a conductive metal-organic framework (MOF) including a metal and triazole structural units; and a metal sulfide including the metal disposed on the conductive MOF, wherein the catalyst is present as spheroid structures having a mean diameter of 5 to 25 μm and a surface texture having projections having a mean size of 100 to 300 nanometer (nm), wherein the metal is cobalt and the triazole structural unit is 1,2,4-triazole, wherein the electrocatalyst has a sulfur to cobalt weight ratio of 0.001 to 0.1 and a nitrogen to cobalt weight ratio of 0.90 to 1.10, and wherein the conductive MOF has a mole ratio of cobalt to 1,2,4-triazole of 1:1.5 to 1:2.

2. The electrocatalyst of claim 1, which is substantially free of cobalt hydroxyfluoride by X-ray diffraction (XRD).

3. The electrocatalyst of claim 1, wherein the conductive MOF is crystalline by XRD.

4. The electrocatalyst of claim 1, wherein the electrocatalyst has a nitrogen to cobalt weight ratio of 0.90 to 0.975.

5. The electrocatalyst of claim 1, wherein the conductive MOF has a mole ratio of cobalt to 1,2,4-triazole of 1:1.5 to 1:1.95.

\* \* \* \* \*